US007810230B2

(12) United States Patent
Ikeda et al.

(10) Patent No.: US 7,810,230 B2
(45) Date of Patent: Oct. 12, 2010

(54) SEALING MEMBER FITTING APPARATUS

(75) Inventors: Yuji Ikeda, Yokohama (JP); Koji Imai, Kawasaki (JP); Minoru Abe, Kawasaki (JP); Jun Funakawa, Nagoya (JP); Koichi Nakajima, Handa (JP); Daisuke Toma, Handa (JP); Hirohide Miyazaki, Kariya (JP)

(73) Assignee: Tyco Electronics Japan G.K., Kanagawa-Ken (JP)

( * ) Notice: Subject to any disclaimer, the term of this patent is extended or adjusted under 35 U.S.C. 154(b) by 133 days.

(21) Appl. No.: 11/961,055

(22) Filed: Dec. 20, 2007

(65) Prior Publication Data
US 2008/0155816 A1 Jul. 3, 2008

(30) Foreign Application Priority Data
Dec. 28, 2006 (JP) ............................. 2006-355072

(51) Int. Cl.
*H01R 43/00* (2006.01)
(52) U.S. Cl. .............................. 29/748; 29/749; 29/752; 29/755; 29/759; 29/868; 29/857; 29/858
(58) Field of Classification Search ................... 29/748, 29/749, 752, 755, 759, 868, 857, 858
See application file for complete search history.

(56) References Cited
U.S. PATENT DOCUMENTS
5,127,147 A * 7/1992 Toyoda ...................... 29/566.3
6,032,366 A * 3/2000 Tominaga et al. ............ 30/90.1

FOREIGN PATENT DOCUMENTS
JP      07015821        1/1995
JP      11164434        11/1997
JP      2004-042234 A   12/2004

OTHER PUBLICATIONS
Austrian Search and Examination Report dated Jun. 19, 2009.
* cited by examiner Primary Examiner—Derris H Banks
Assistant Examiner—Azm Parvez
(74) Attorney, Agent, or Firm—Barley Snyder LLC

(57) ABSTRACT

A sealing member fitting apparatus includes a sealing member transfer device that switches between a sealing member receiving position where the sealing member transfer device faces a sealing member holding device provided with a hollow sealing member and a sealing member fitting position where the sealing member transfer device faces an electrical wire clamping device. The sealing member transfer device receives the sealing member in the sealing member receiving position and fits the sealing member on a covering end portion of the electrical wire in the sealing member fitting position. An electrical wire insertion guide device is disposed between the sealing member transfer device and the electrical wire clamping device and is slidable along the electrical wire from a lead-out member to the covering end portion. The sealing member transfer device positions a central axis of the covering end portion substantially coaxially with a central axis of the sealing member.

11 Claims, 30 Drawing Sheets

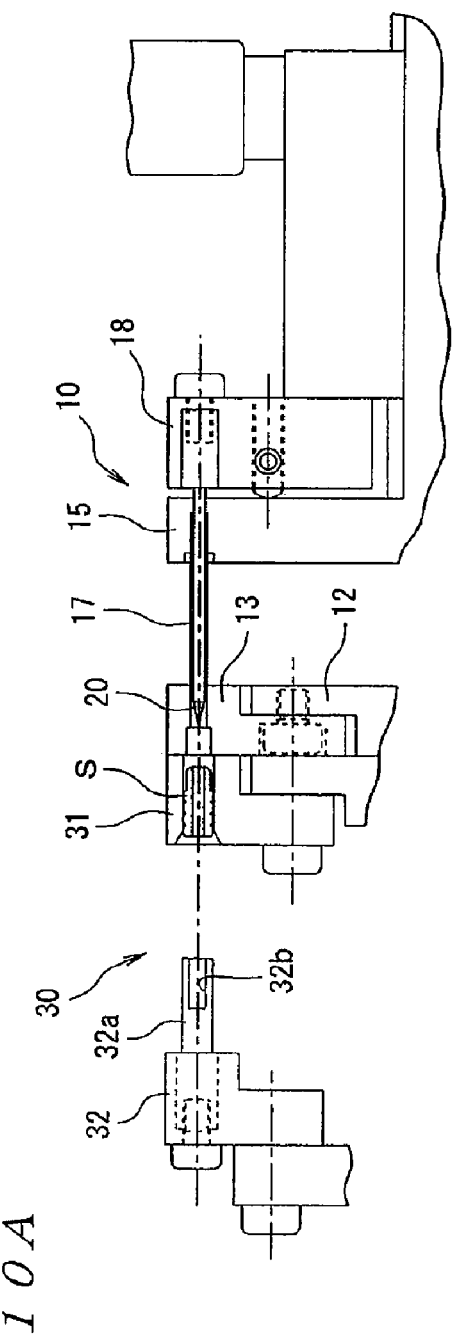
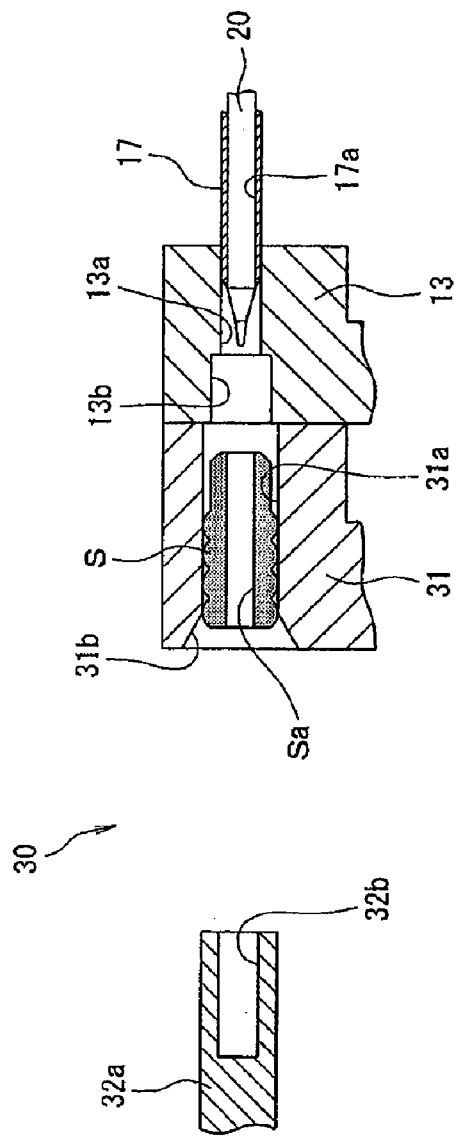
FIG.10A
FIG.10B

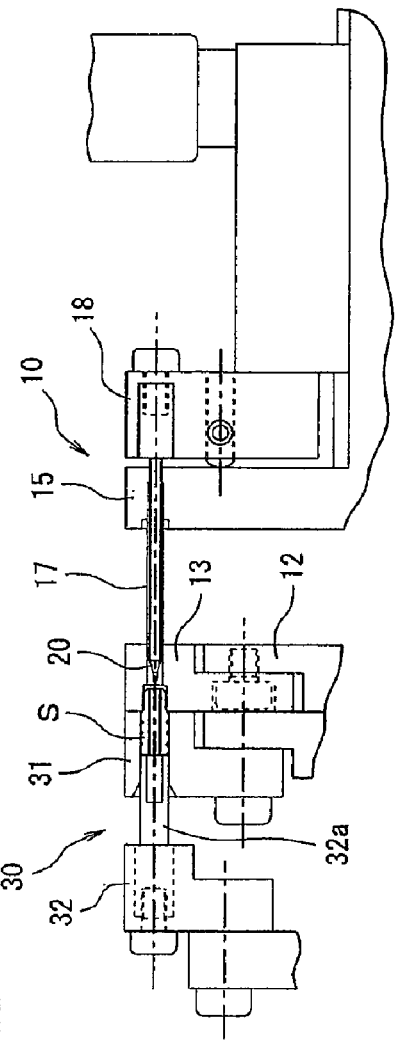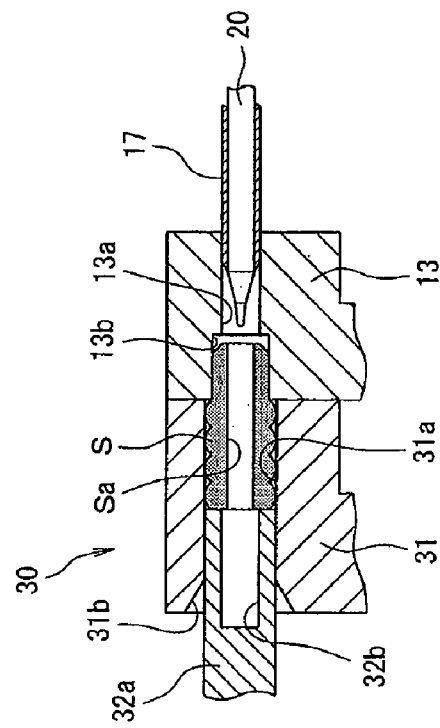
FIG. 11A
FIG. 11B

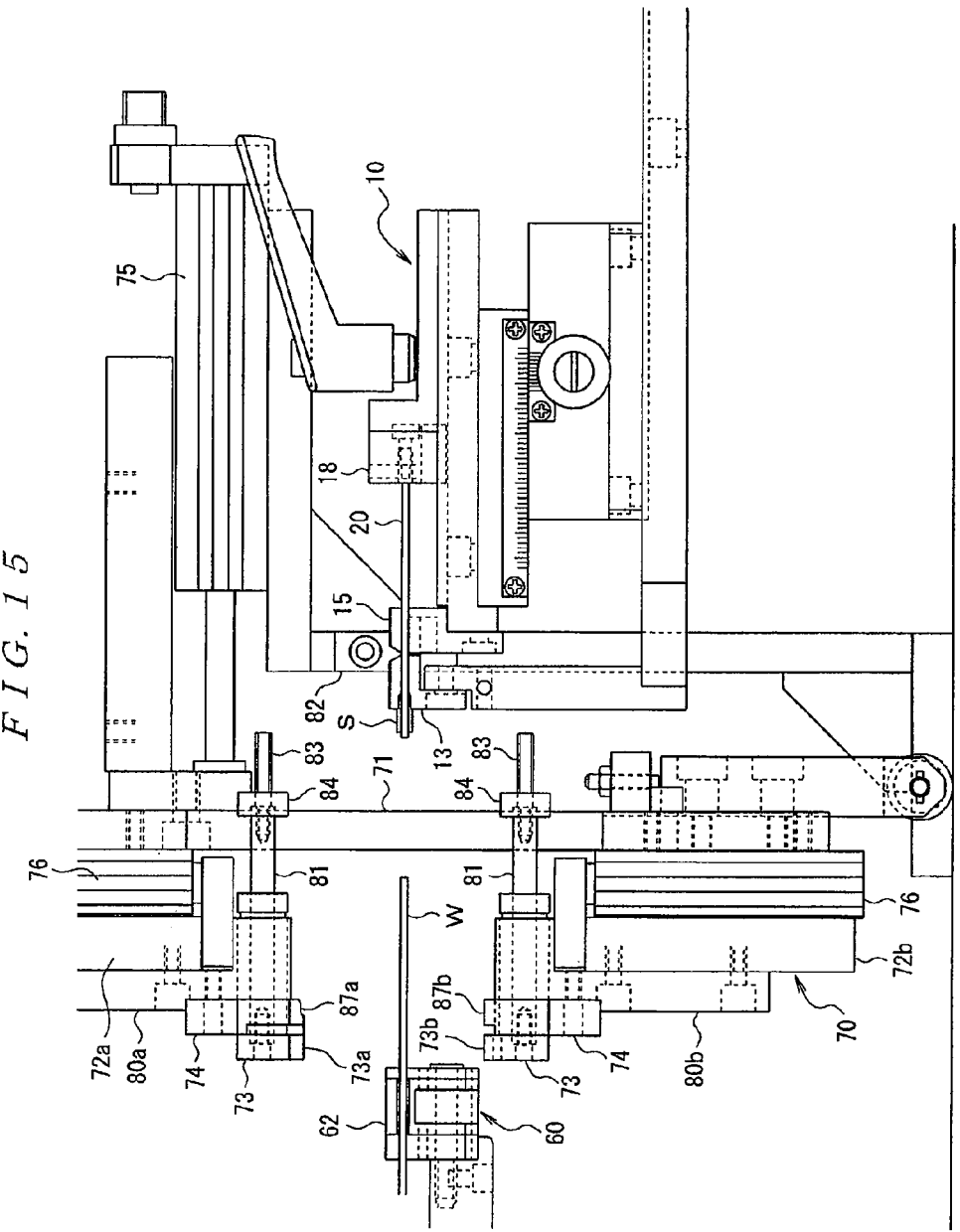

US 7,810,230 B2

SEALING MEMBER FITTING APPARATUS

CROSS-REFERENCE TO RELATED APPLICATIONS

This application claims the benefit of the filing date under 35 U.S.C. § 119(a)-(d) of Japan Patent Application No. 2006-355072, filed Dec. 28, 2006.

FIELD OF THE INVENTION

The present invention relates to a sealing member fitting apparatus that automatically aligns and fits a hollow sealing member on a covering end portion of an electrical wire.

BACKGROUND

FIG. 30 shows an example of a sealing member fitting apparatus 100 according to the prior art (see JP 2004-42234A). The sealing member fitting apparatus 100 automatically fits a hollow sealing member on one end portion of an electrical wire and comprises a rubber plug transfer mechanism 110 and an electrical wire insertion device 120. The rubber plug transfer mechanism 110 comprises a rubber plug holding member 111, a middle pin 113, and a fitting pin 112. The rubber plug holding member 111 is passed through a rubber plug and holds the rubber plug S in position as it is fed through a tube by compressed air or the like. The middle pin 113 transfers the rubber plug S to the fitting pin 112 by fitting the fitting pin 112 over the rubber plug S in a transfer position A. The rubber plug S that is fitted over the fitting pin 112 in the transfer position A is then transported to a fitting position B by a rotary pin holder 114 that rotates the fitting pin 112 180 degrees.

The electrical wire insertion device 120 comprises a rubber plug holder 121, an electrical wire guide 122, an anti-buckling guide 123, and an electrical wire clamp 124. The rubber plug holder 121 holds the rubber plug S that is transported to the fitting position B by the fitting pin 112 and fits the rubber plug S on an electrical wire W. The rubber plug holder 121 comprises a chuck cylinder 126 and a pair of gripping arms 127 (left and right gripping arms) that are opened and closed by the chuck cylinder 126. The chuck cylinder 126 is fastened to a movable base stand 132 that can move in a horizontal direction (left-right direction in FIG. 30) along a guide rail 131 fastened to a base stand 130. Semicircular grooves 128 that have the same shape as the rubber plug S are formed at tip end portions of the gripping arms 127. When the gripping arms 127 are closed, the semicircular grooves 128 form a circular opening that accommodates and holds the rubber plug S that is fitted over the fitting pin 112.

The electrical wire guide 122 is installed facing the gripping arms 127 of the rubber plug holder 121 and is used to position and hold a tip end T of the electrical wire W by causing this tip end member T to coincide with an axial core of the fitting pin 112. The electrical wire guide 122 comprises a chuck cylinder 134 and a pair of gripping arms 135 (left and right gripping arms) to be opened and closed by the chuck cylinder 134. Semicircular grooves 136 having a radius which is such that the total of the respective radii is slightly larger than an external diameter of the electrical wire W are formed at tip end portions of the individual gripping arms 135. When the gripping arms 135 are closed, the semicircular grooves 136 of the gripping arms 135 form a circular opening that holds the tip end T of the electrical wire W by allowing the tip end T to be fitted with play inside the aperture. The chuck cylinder 134 is fastened to the movable base stand 132.

The anti-buckling guide 123 is used to hold the electrical wire W between the electrical wire guide 122 and the electrical wire clamp 124 that is installed away from the electrical wire guide 122 and to prevent the electrical wire W from drooping and buckling. The anti-buckling guide 123 comprises a chuck cylinder 138 and a pair of gripping arms 139 (left and right gripping arms) to be opened and closed by the chuck cylinder 138. Semicircular grooves 140 having a radius which is such that the total of the respective radii is slightly larger than the external diameter of the electrical wire W are formed at tip end portions of the individual gripping arms 139. When the gripping arms 139 are closed, the semicircular grooves 140 of the gripping arms 139 form a circular opening that holds the electrical wire W by allowing the electrical wire W to be fitted with play inside the opening. The chuck cylinder 138 is fastened to the base stand 130 and therefore does not move in the horizontal direction.

The electrical wire clamp 124 comprises a pair of gripping arms 143 (left and right gripping arms) pivoted about a supporting shaft 142 that is fastened to the base stand 130. Semicircular grooves (not shown) having a radius which is such that the total of the respective radii is the same as the external diameter of the electrical wire W are formed at tip end portions of the individual gripping arms 143 in a manner facing each other. When the gripping arms 143 are closed, the semicircular grooves (not shown) of the gripping arms 143 form a circular opening that grips the electrical wire W. The gripping arms 143 are opened and closed by an air cylinder (not shown) that is fastened to the base stand 130.

When the rubber plug S is to be fitted on the electrical wire W by the rubber plug fitting apparatus 100, the rubber plug S that is fitted over the fitting pin 112 and transported to the fitting position B is first held by the rubber plug holder 121. The electrical wire W is held by the electrical wire guide 122, the anti-buckling guide 123, and the electrical wire clamp 124, and the electrical wire W and the fitting pin 112 are disposed in a straight line. Here, an electrical wire insertion opening (not shown) that allows the insertion of the tip end T of the electrical wire W is formed at a tip end portion of the fitting pin 112, and the electrical wire W and fitting pin 112 are disposed such that the electrical wire insertion opening (not shown) and the tip end T of the electrical wire W face each other.

The movable base stand 132 is then moved toward the base stand 130, so that the rubber plug holder 121 is caused to move, together with the fitting pin 112, in a direction approaching the electrical wire W thereby inserting the tip end T of the electrical wire W into the electrical wire insertion opening (not shown) in the fitting pin 112 to a specified length. Only the fitting pin 112 is caused to move in the direction away from the electrical wire W without moving the rubber plug holder 121. When this is done, because the rubber plug S is held by the rubber plug holder 121, the fitting pin 112 is removed from the rubber plug S, so that the rubber plug S is fitted on the electrical wire W at a specified location.

Thus, with the rubber plug fitting apparatus 100 shown in FIG. 30, by using a construction in which the rubber plug S is fitted over the fitting pin 112 having an electrical wire insertion opening (not shown) formed therein, and the tip end T of the electrical wire W is then inserted into the electrical wire insertion opening (not shown) in the fitting pin 112, the insertion resistance during the insertion of the electrical wire W into the rubber plug S can be reduced, so that buckling of the electrical wire W can be prevented.

However, in the rubber plug fitting apparatus 100 shown in FIG. 30, when the electrical wire W is to be held by the electrical wire guide 122 and anti-buckling guide 123, it is necessary to manually perform the setting of the electrical wire W on the semicircular grooves 136 of the gripping arms 135 of the electrical wire guide 122 and the setting of the electrical wire W on the semicircular grooves 140 of the gripping arms 139 of the anti-buckling guide 123. Accordingly, the rubber plug fitting apparatus 100 has a problem in that it is difficult to increase the operation efficiency.

SUMMARY

It is therefore an object of the present invention to provide a sealing member fitting apparatus that can automatically set an electrical wire in an electrical wire covering end portion guide device that positions a central axis of a covering end portion of the electrical wire with a central axis of a hollow sealing member.

This and other objects are achieved by a sealing member fitting apparatus comprising a sealing member holding device provided with a hollow sealing member and an electrical wire clamping device that clamps an electrical wire such that a lead-out member and a covering end portion of the electrical wire extend from one side thereof. A sealing member transfer device switches between a sealing member receiving position that faces the sealing member holding device and a sealing member fitting position that faces the electrical wire clamping device. The sealing member transfer device receives the sealing member in the sealing member receiving position and fits the sealing member on the covering end portion of the electrical wire in the sealing member fitting position. An electrical wire insertion guide device is disposed between the sealing member transfer device and the electrical wire clamping device. The electrical wire insertion guide device is slidable along the electrical wire from the lead-out member of the electrical wire to the covering end portion of the electrical wire. The electrical wire insertion guide device positions a central axis of the covering end portion of the electrical wire substantially coaxially with a central axis of the sealing member.

BRIEF DESCRIPTION OF THE DRAWINGS

FIG. 10A is a schematic diagram of the sealing member holding device and the sealing member transfer device showing a state in which a first member has advanced from the state shown in FIG. 9A;

FIG. 10B is a schematic sectional view of elements of the sealing member holding device and the sealing member transfer device shown in FIG. 10A;

FIG. 11A is a schematic diagram of the sealing member holding device and the sealing member transfer device showing a state in which a seal pressing member has advanced from the state shown in FIG. 10A;

FIG. 11B is a schematic sectional view of elements of the sealing member holding device and the sealing member transfer device shown in FIG. 11A;

FIG. 15 is a schematic side view of the sealing member transfer device, an electrical wire clamping device, and an electrical wire insertion guide device showing the electrical wire insertion guide device is in the initial state and located in an electrical wire holding position;

DETAILED DESCRIPTION OF THE EMBODIMENT(S)

Figure 1:
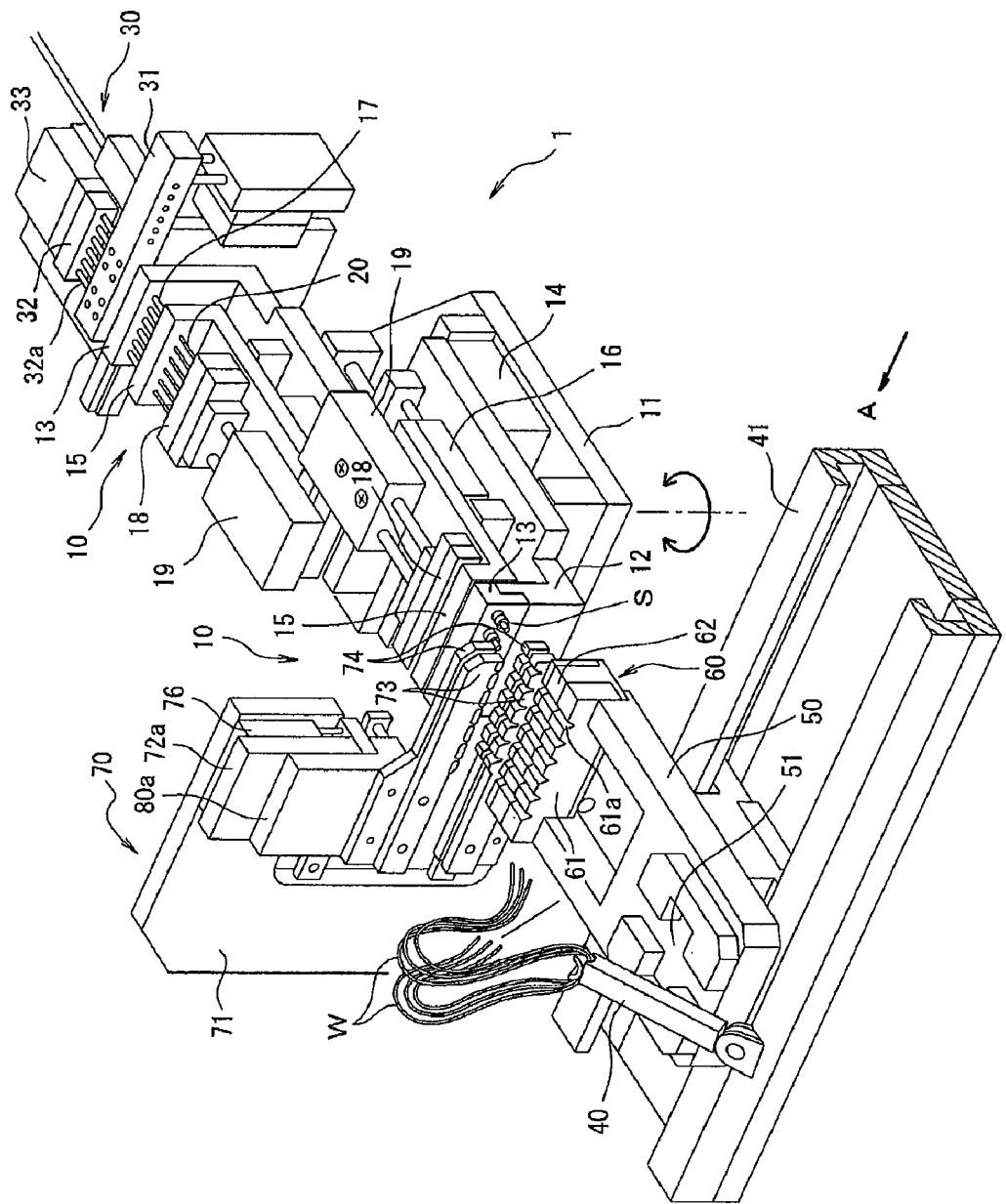
FIG. 1 is a schematic perspective view of a sealing member fitting apparatus according to an embodiment of the present invention.
Figure 30:
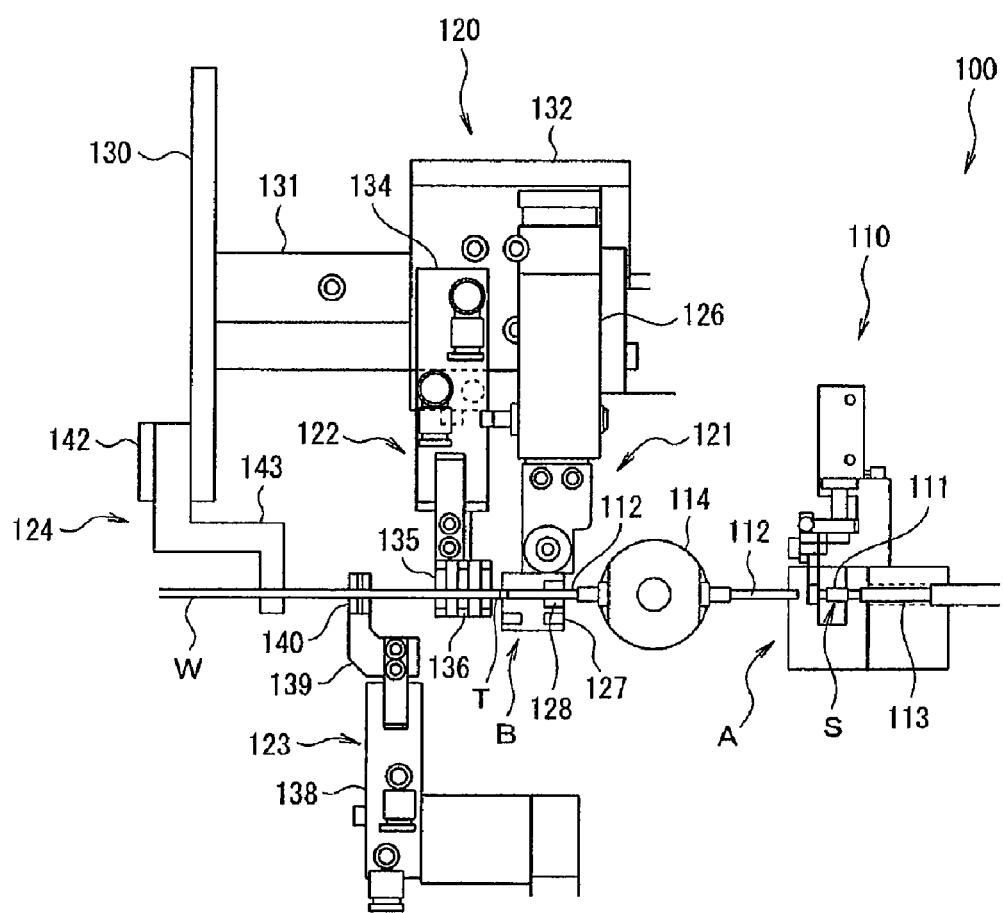
FIG. 30 is a schematic front view of a sealing member fitting apparatus according to the prior art.

FIG. 1 shows a sealing member fitting apparatus 1 according to the present invention. The sealing member fitting apparatus 1 may be used in an automated terminal treatment apparatus that is employed for the same purposes as the sealing member fitting apparatus 100 shown in FIG. 30. The sealing member fitting apparatus 1 comprises a sealing member transfer device 10, a sealing member holding device 30, an electrical wire supporting member 40, an electrical wire supporting member setting jig 50, an electrical wire clamping device 60, and an electrical wire insertion guide device 70. In the following description, the side away from the viewer in FIG. 1 is referred to as the rear side, and the side toward the viewer in FIG. 1 is referred to as the front side. However, in the description of the sealing member transfer devices 10, the side on which a first member 13 approaches the electrical wire insertion guide device 70 or the sealing member holding device 30 is defined as the front side, and the side opposite of that is defined as the rear side.

Figures 9A, 9B:
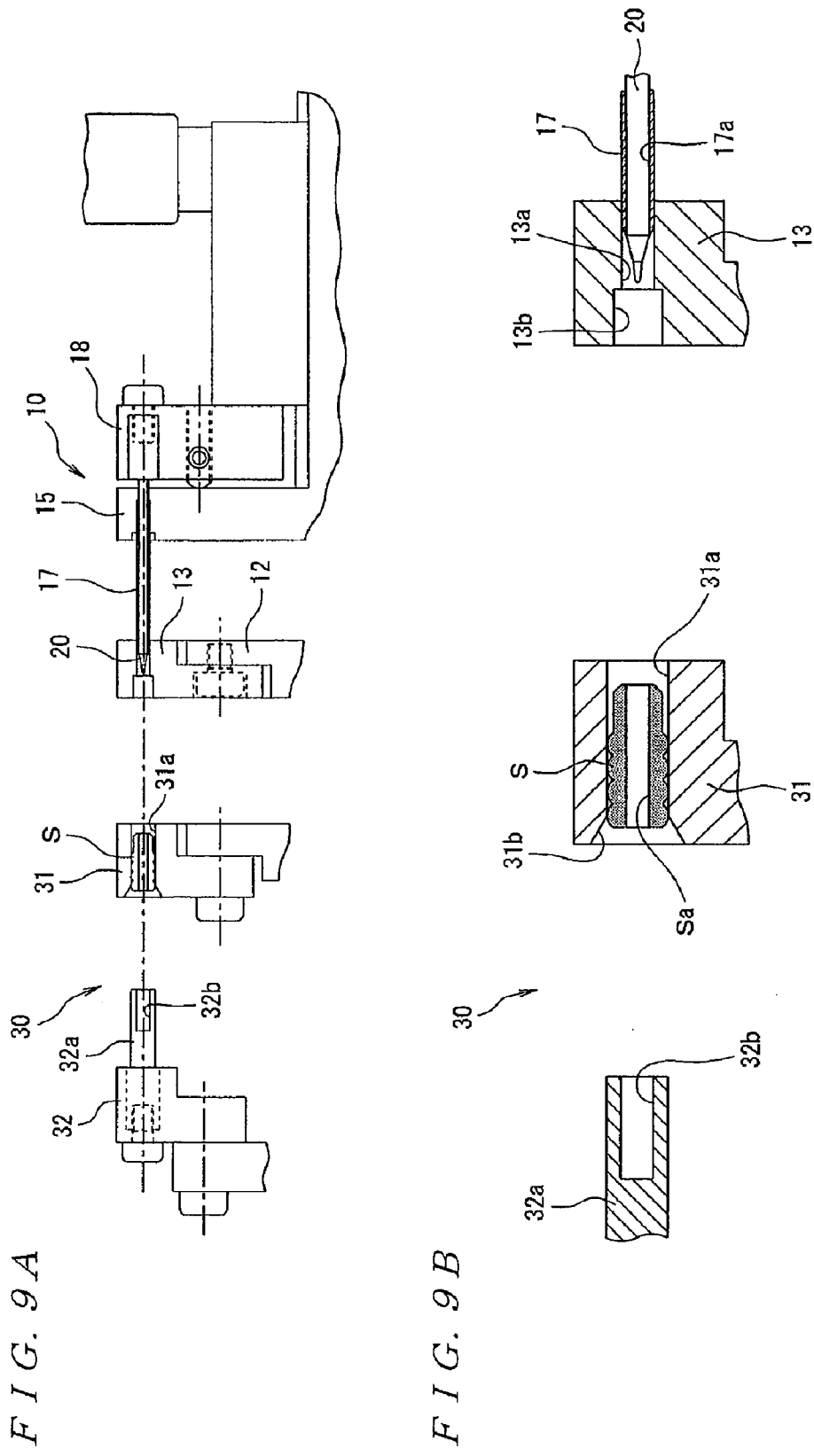
FIG. 9A is a schematic diagram of a sealing member holding device and a sealing member transfer device arranged in an initial state or sealing member receiving position.
FIG. 9B is a schematic sectional view of elements of the sealing member holding device and the sealing member transfer device shown in FIG. 9A.

As shown in FIG. 1, the sealing member holding device 30 is disposed to the rear side of the sealing member transfer device 10. The sealing member holding device 30 comprises a sealing member holder 31, a seal pressing member 32, and a pressing member cylinder 33. As shown in FIGS. 9A-9B, the sealing member holder 31 has a plurality of through-apertures 31a passing there through configured to hold a plurality of substantially hollow sealing members S that have a sealing member opening Sa (FIG. 9B) extending there through. The sealing members S are conveyed to the sealing member holder 31 from a sealing member supply source (not shown). A tapered surface 31b for facilitating the insertion of the sealing members S is formed at a rear end edge of each of the through-apertures 31a.

The seal pressing member 32 is configured to press the sealing members S forward from the rear side during the transfer of the sealing members S. The seal pressing member 32 comprises a plurality of pressing members 32a and receiving opening 32b that extend from the front side toward the rear side. The seal pressing member 32 is made movable in the forward-rearward direction by the pressing member cylinder 33.

As shown in FIG. 1, a pair of the sealing member transfer devices 10 is installed on a base plate 11. The base plate 11 is capable of pivoting in a direction of the arrows in FIG. 1. The sealing member transfer devices 10 can switch between a sealing member receiving position, which faces the sealing member holding device 30, and a sealing member fitting position, which faces the electrical wire clamping device 60. The base plate 11 pivots such that when one of the sealing member transfer devices 10 is located in the sealing member receiving position facing the sealing member holding device 30, the other sealing member transfer device 10 is always located in the sealing member fitting position facing the electrical wire clamping device 60.

As shown in FIGS. 9A-9B, each of the sealing member transfer devices 10 comprises a first member 13 that can advance and retract. The first member 13 is attached to a first member supporting plate 12. The first member supporting plate 12 is made movable in the forward-rearward direction by a first member cylinder 14 (FIG. 1). The first member 13 is provided with a plurality of through-apertures 13a that pass there through in a forward-rearward direction. Sealing member receiving recessed members 13b that are configured to receive the sealing members S are formed at front ends of the through-apertures 13a. A plurality of cylindrical bodies 17 that advance and retract by being installed inside the first member 13 are arranged in the through-apertures 13a. The cylindrical bodies 17 protrude from the first member 13 in an advanced position and are accommodated inside the first member 13 in a retracted position. Rear end portions of the cylindrical bodies 17 are fastened to a cylindrical body supporting member 15. The cylindrical body supporting member 15 is made movable in the forward-rearward direction by a cylindrical body cylinder 16 (FIG. 1).

Each of the cylindrical bodies 17 has a through-aperture 17a that passes there through in a forward-rearward direction that receives a guide member 20. The guide members 20 that advance and retract by being disposed inside the cylindrical bodies 17 protrude from the cylindrical bodies 17 in an advanced position but are accommodated in the cylindrical bodies 17 in a retracted position. Each of the guide members 20 is constructed from a substantially rod shaped body and has a front end portion with a substantially tapered circular conic-shaped guide member. A rear end portion is fastened to a guide member supporting member 18. The guide member supporting member 18 is made movable in the forward-rearward direction by a guide member cylinder 19 (FIG. 1).

As shown in FIG. 1, the electrical wire supporting member 40 has one end portion designed to support a plurality of the electrical wires W and one end portion supported in a pivotable manner on an electrical wire transport conveyer 41 that is installed to the front side of the sealing member transfer device 10. The electrical wire transport conveyer 41 is designed to move in the left-right direction indicated by arrow A and to successively transport the electrical wires W. The electrical wire supporting member setting jig 50 is installed on the electrical wire transport conveyer 41 and is provided on the upper surface thereof with a support member 51. The support member 51 supports the electrical wire supporting member 40 in an initial state with the sealing member transfer device 10 being located in the sealing member fitting position. The electrical wire clamping device 60 is installed on the rear end portion of the electrical wire supporting member setting jig 50. The electrical wire clamping device 60 comprises a clamping member 62 that clamps a plurality of the electrical wires W in a vicinity of the covering end portions thereof at a specified pitch. An electrical wire introduction member 61 is provided to the front side of the clamping member 62 and has a plurality of electrical wire introduction grooves 61a.

Figure 2:
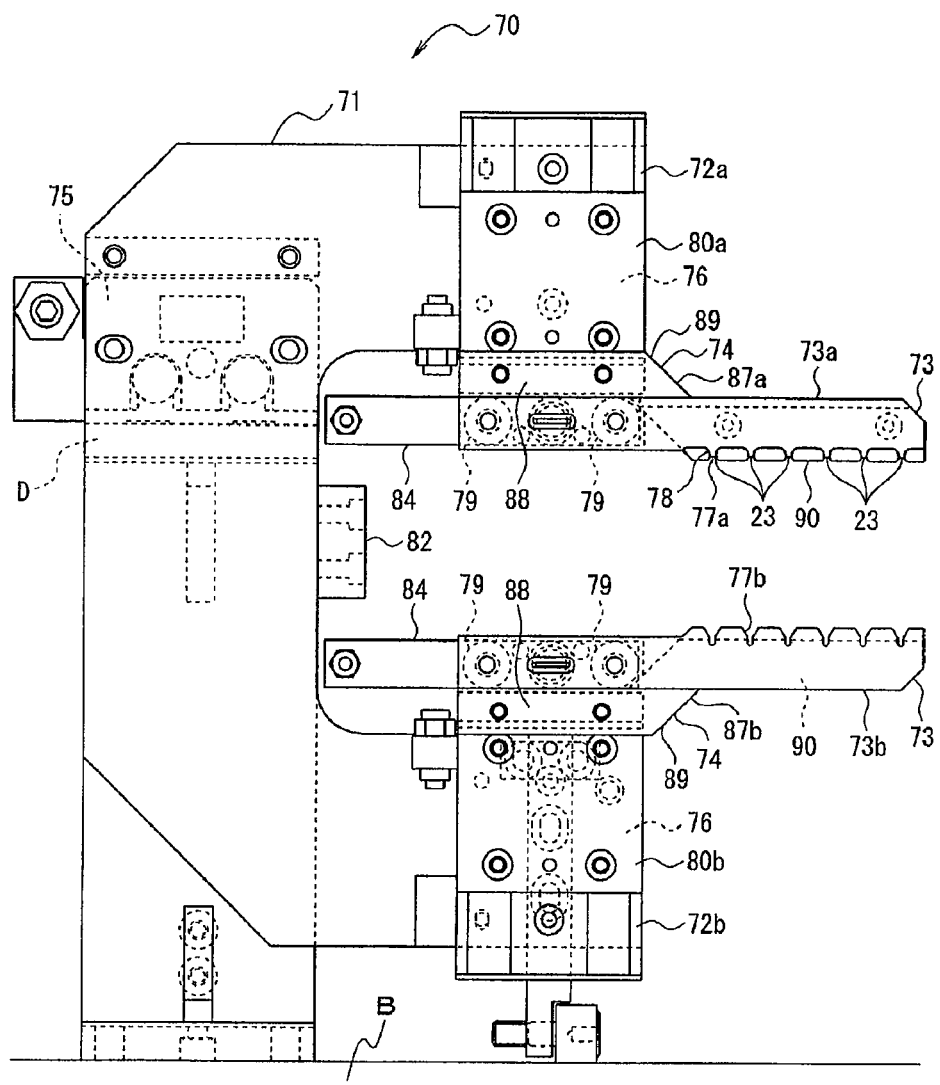
FIG. 2 is a schematic front view of an electrical wire insertion guide device shown in an initial position.
Figure 3:
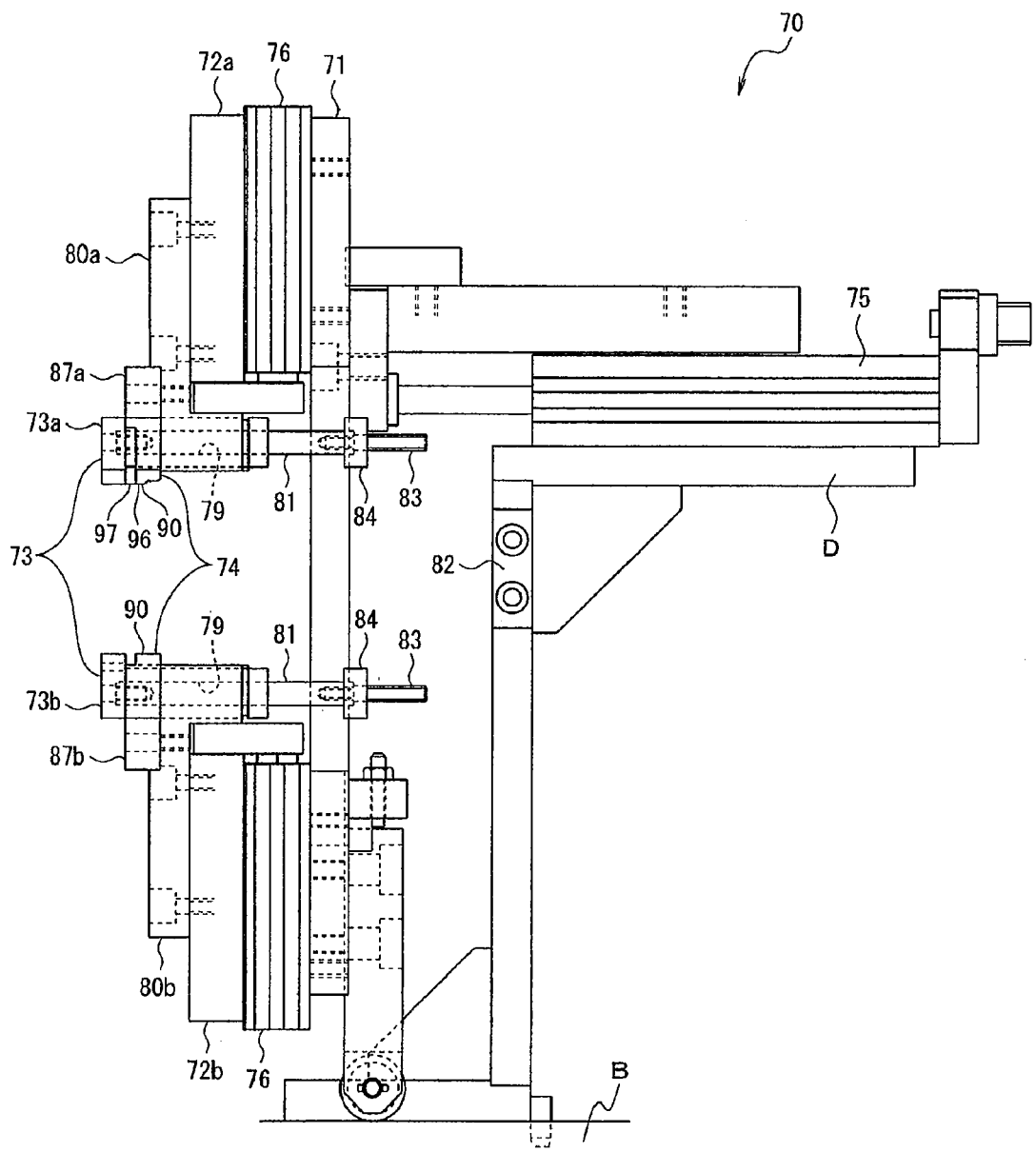
FIG. 3 is a schematic side view of the electrical wire insertion guide device shown in FIG. 2.

The electrical wire insertion guide device 70 is installed to the rear side of the electrical wire clamping device 60 and comprises an advancing and retracting base 71 that can move in the forward-rearward direction. As shown in FIGS. 2-7, the advancing and retracting base 71 is formed substantially in a C-shape, as viewed from the forward-rearward direction, and is installed with an open side thereof facing toward the electrical wires W that are clamped by the electrical wire clamping device 60. As shown in FIG. 3, the advancing and retracting base 71 is installed so as to be movable in the forward-rearward direction with respect to a base B by an advancing and retracting cylinder 75 fastened to a base stand D that is installed in an upright position on the base B. As shown in FIG. 2, a push-in piece 82 for pushing in pushing pins 83 (FIG. 18) is installed on the side surface of the base stand D.

As shown in FIGS. 2-7, a pair of ascending and descending base members 72a, 72b is attached to the advancing and retracting base 71 and are capable of moving up and down. The ascending and descending base members 72a, 72b are installed so as to be movable in a vertical direction with respect to the advancing and retracting base 71 by means of ascending and descending cylinders 76 that are fastened to end portions of the advancing and retracting base 71.

An electrical wire intermediate member holding unit 73 is attached to the ascending and descending base members 72a, 72b. The electrical wire intermediate member holding unit 73 comprises an intermediate member upper holding piece 73a and an intermediate member lower holding piece 73b. The intermediate member upper holding piece 73a and the intermediate member lower holding piece 73b are capable of opening and closing in the vertical direction by forming a pair. A plurality of electrical wire receiving grooves 77b that extend in the forward-rearward direction are formed in an upper surface of the intermediate member lower holding piece 73b from a central portion to one end portion thereof. The electrical wire receiving grooves 77b are formed at the same pitch as the electrical wires W that are clamped in the electrical wire clamping device 60. A plurality of electrical wire retaining members 78 that face the electrical wire receiving grooves 77b in the intermediate member lower holding piece 73b are formed on an undersurface of the intermediate member upper holding piece 73a from a central portion to one end portion thereof. Substantially circular arc-form recessed members 77a that are cut out in a substantially circular arc shape as seen from the forward-rearward direction are formed in lower end portions of the electrical wire retaining members 78.

When the intermediate member upper holding piece 73a and intermediate member lower holding piece 73b are closed, the lower end portions of the electrical wire retaining members 78 of the intermediate member upper holding piece 73a are inserted in the electrical wire receiving grooves 77b of the intermediate member lower holding piece 73b, and the recessed members 77a of the electrical wire retaining members 78 hold from above the electrical wires W that are received in the electrical wire receiving grooves 77b of the intermediate member lower holding piece 73b. Then, when the undersurface of the intermediate member upper holding piece 73a and the upper surface of the intermediate member lower holding piece 73b contact each other, as a result of the intermediate member upper holding piece 73a and the intermediate member lower holding piece 73b being closed, a plurality of holding apertures 91a (FIG. 17) that can hold the electrical wires W in a slidable manner are demarcated by the recessed members 77a in the intermediate member upper holding piece 73a and the electrical wire receiving grooves 77b in the intermediate member lower holding piece 73b. The holding apertures 91a are designed such that central axes of the held electrical wires W can be positioned substantially coaxially with the central axes of the cylindrical bodies 17 of the sealing member transfer device 10 that is located in the sealing member fitting position. The electrical wire intermediate member holding unit 73 is placed in a closed state as a result of the undersurface of the intermediate member upper holding piece 73a and the upper surface of the intermediate member lower holding piece 73b contacting each other when the intermediate member upper holding piece 73a and intermediate member lower holding piece 73b are closed.

Figure 4:
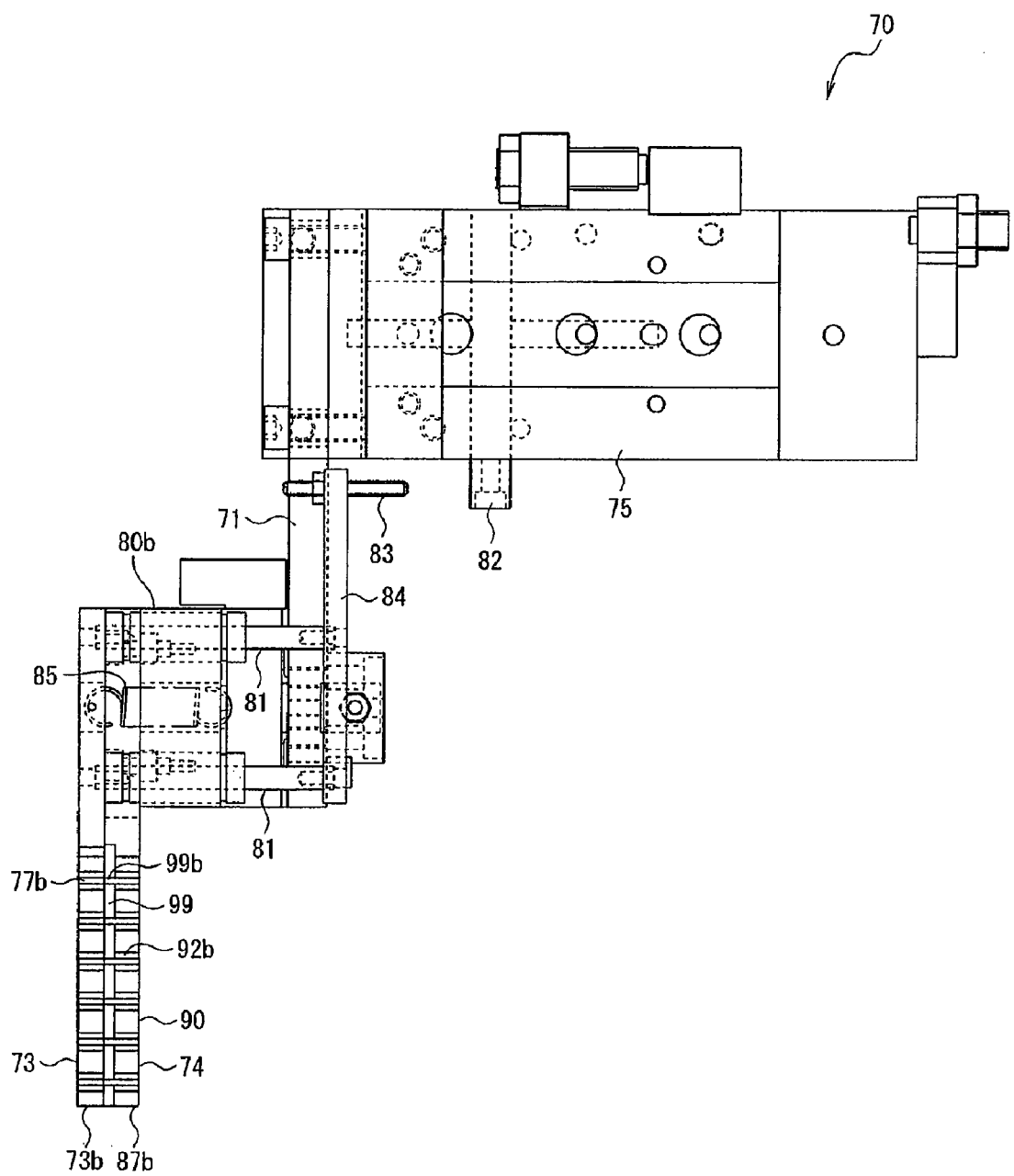
FIG. 4 is a schematic plan view of the electrical wire insertion guide device shown in FIG. 2.

An electrical wire covering end portion holding unit 74 is attached to the ascending and descending base members 72a, 72b. Electrical wire holding unit attachment plates 80a, 80b each having advancing and retracting rod insertion apertures 79 that extend in the forward-rearward direction are fastened to the ascending and descending base members 72a, 72b. As shown in FIGS. 3-4, one end portion of advancing and retracting rods 81 that extend in the forward-rearward direction is fastened to each of the rear surfaces of the intermediate member upper holding piece 73a and intermediate member lower holding piece 73b. The advancing and retracting rods 81 of the intermediate member lower holding piece 73b are passed through the advancing and retracting rod insertion apertures 79 in the lower-side electrical wire holding unit attachment plate 80b in a slidable manner. As a result, the intermediate member lower holding piece 73b is attached to the lower-side ascending and descending base member 72b.

Figure 5:
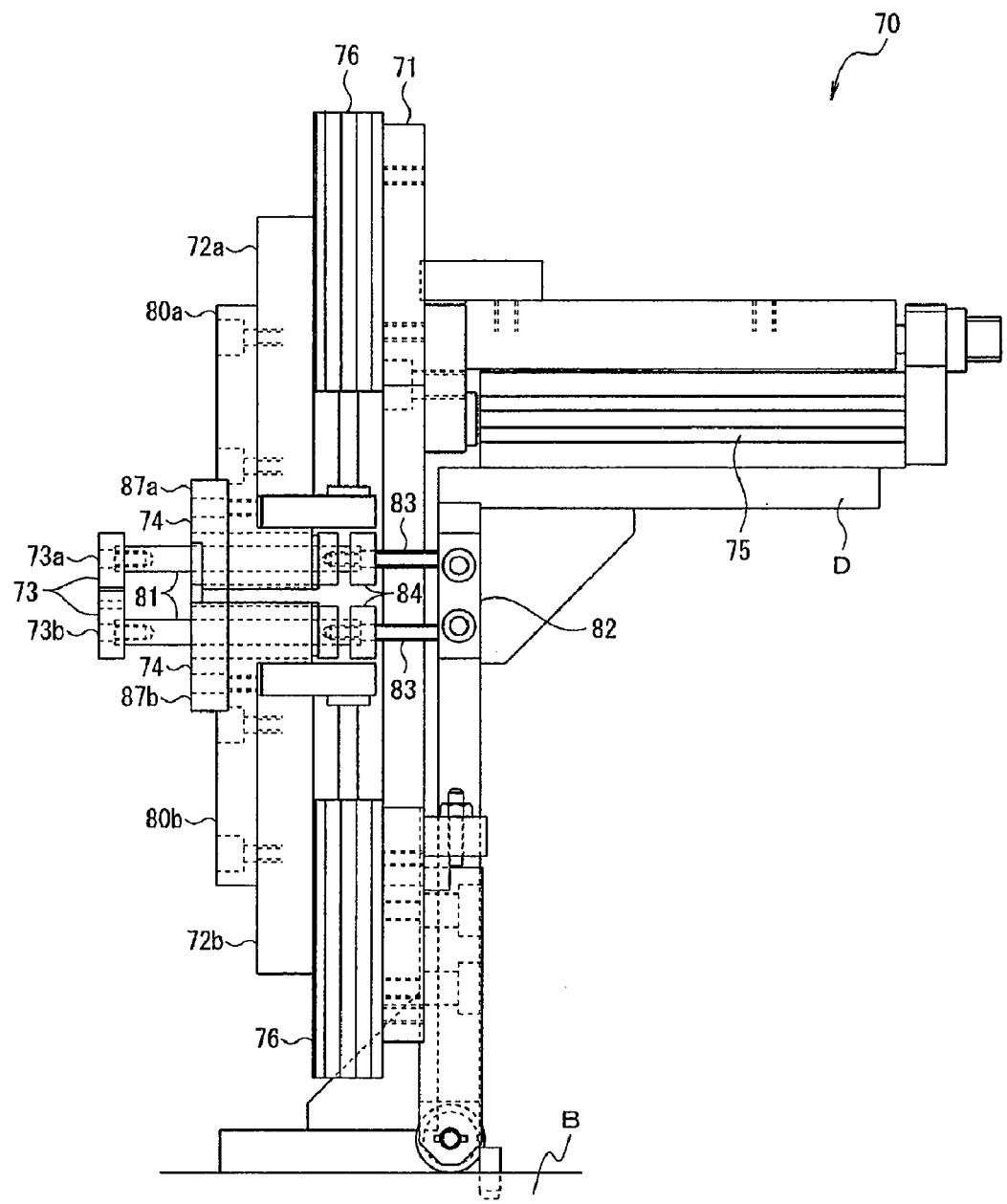
FIG. 5 is a schematic side view of the electrical wire insertion guide device shown during fitting of a sealing member.
Figure 6:
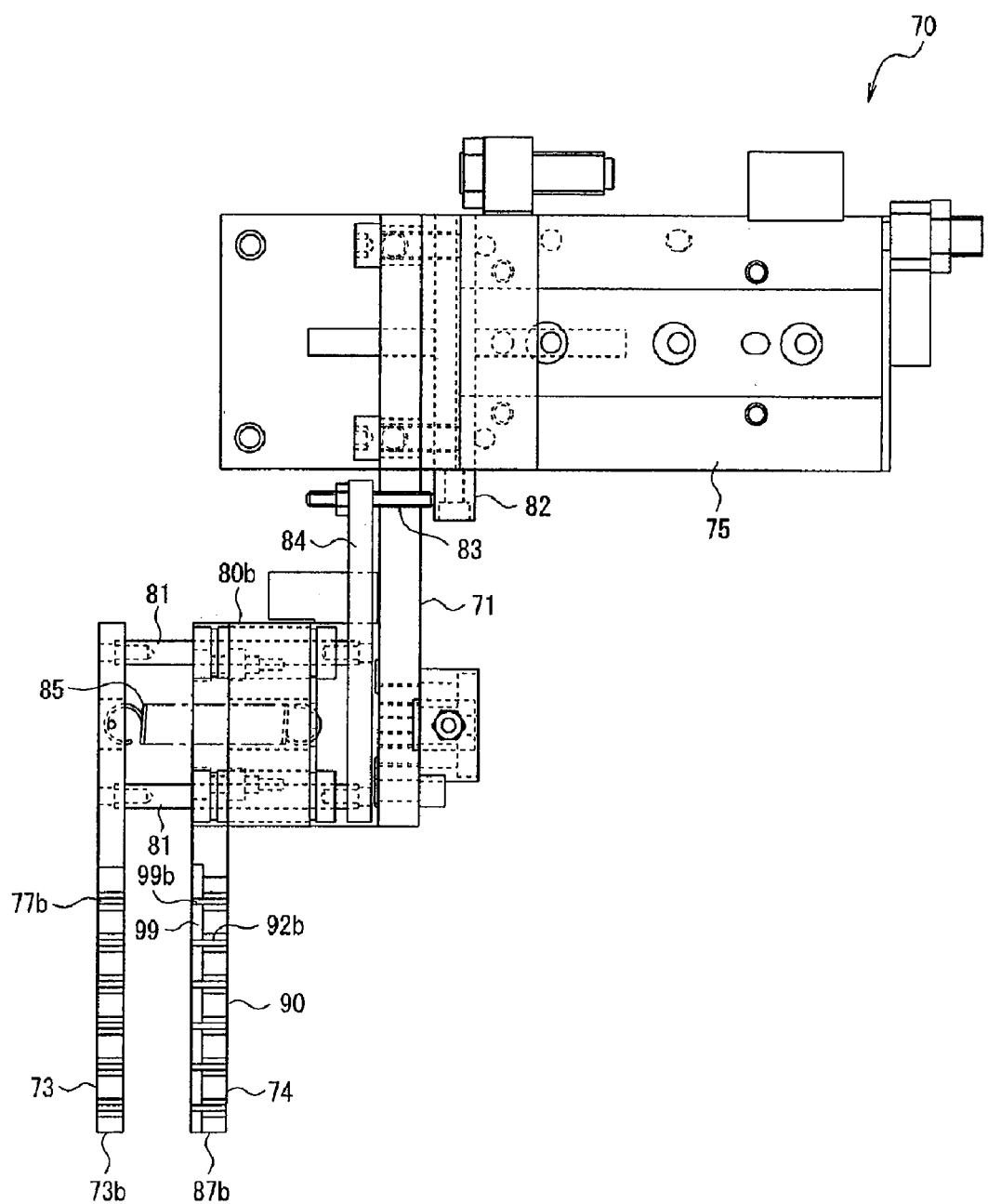
FIG. 6 is a schematic plan view of the electrical wire insertion guide device shown in FIG. 5.

As shown in FIG. 4, the intermediate member lower holding piece 73b and the electrical wire holding unit attachment plate 80b are linked by a tension spring 85 that is driven in opposing directions. A pushing plate 84 is attached to the other end portions of the advancing and retracting rods 81 that are passed through the advancing and retracting rod insertion apertures 79. A pushing pin 83 that extends in the forward-rearward direction is disposed at one end portion of the pushing plate 84. The intermediate member lower holding piece 73b is moved forward with respect to the ascending and descending base member 72b as a result of the pushing pin 83 of the pushing plate 84 being pushed in toward the front as shown in FIGS. 5-6. When the pushing pin 83 is released, the intermediate member lower holding piece 73b is moved toward the ascending and descending base member 72b by tension of the tension spring 85.

The advancing and retracting rods 81 of the intermediate member upper holding piece 73a are passed through the advancing and retracting rod insertion apertures 79 in the upper-side electrical wire holding unit attachment plate 80*a* in a slidable manner. As a result, the intermediate member upper holding piece 73*a* is attached to the upper-side ascending and descending base member 72*a*. Moreover, as in the case with the intermediate member lower holding piece 73*b*, the intermediate member upper holding piece 73*a* and electrical wire holding unit attachment plate 80*a* are linked by a tension spring (not shown) that is driven in the direction of tension. The pushing plate 84 is attached to the other end portions of the two advancing and retracting rods 81 that are passed through the advancing and retracting rod insertion apertures 79. A pushing pin 83 that extends in the forward-rearward direction is disposed at one end portion of the pushing plate 84. The intermediate member upper holding piece 73*a* is moved forward with respect to the ascending and descending base member 72*a* as a result of the pushing pin 83 of the pushing plate 84 being pushed in toward the front. When the pushing pin 83 is released, the intermediate member upper holding piece 73*a* is moved toward the ascending and descending base member 72*a* by tension of the tension spring 85.

When the advancing and retracting base 71 is retracted in a state in which the intermediate member upper holding piece 73*a* and intermediate member lower holding piece 73*b* are closed, the electrical wire intermediate member holding unit 73 retracts, so that the push-in piece 82 on the base stand D is disposed in a position where the end surfaces of the pushing pins 83 contact the push-in piece 82. When the advancing and retracting base 71 is retracted further in this state, the push-in piece 82 pushes the pushing pins 83 forward, and this causes the ascending and descending base members 72*a*, 72*b* installed on the advancing and retracting base 71 to be retracted in a state in which the retraction of the electrical wire intermediate member holding unit 73 is stopped. As a result, the holding pieces 73*a*, 73*b* are moved forward with respect to the ascending and descending base members 72*a*, 72*b*.

When the advancing and retracting base 71 is caused to advance, the pushing of the pushing pins 83 by the push-in piece 82 is released, so that the holding pieces 73*a*, 73*b* that have been moved forward with respect to the ascending and descending base members 72*a*, 72*b* are moved toward the ascending and descending base members 72*a*, 72*b* by the tension of the tension springs 85. Consequently, the intermediate member upper holding piece 73*a* and intermediate member lower holding piece 73*b* are moved simultaneously in the forward-rearward direction, with the recessed members 77*a* of the intermediate member upper holding piece 73*a* and the electrical wire receiving grooves 77*b* of the intermediate member lower holding piece 73*b* being caused to face each other.

As shown in FIGS. 2-3, the electrical wire covering end portion holding unit 74 has a covering end portion upper holding piece 87*a* and a covering end portion lower holding piece 87*b*. The covering end portion upper holding piece 87*a* and the covering end portion lower holding piece 87*b* are capable of opening and closing in the vertical direction by forming a pair. As shown in FIG. 2, the covering end portion lower holding piece 87*b* comprises a fastening member 88 that extends in the left-right direction and a holding member 90 that is connected to the fastening member 88 via a linking member 89 that extends upward at an inclination.

As shown in FIG. 4, a plurality of electrical wire receiving grooves 92*b* that extends in the forward-rearward direction are formed in an upper surface of the holding member 90 of the covering end portion lower holding piece 87*b*. The shape of each of the electrical wire receiving grooves 92*b* is substantially the same as the shape of each of the electrical wire receiving groove 77*b* of the intermediate member lower holding piece 73*b*. A plurality of cylindrical body receiving grooves 94*b* (FIG. 21) that extend in the forward-rearward direction are formed in the upper surface of the holding member 90 of the covering end portion lower holding piece 87*b* to the rear side of the electrical wire receiving grooves 92*b*. A planar cutout surface 99 is formed on the upper surface of the holding member 90 of the covering end portion lower holding piece 87*b* to the front side of the electrical wire receiving grooves 92*b*. A plurality of electrical wire receiving grooves 99*b* that is continuous with the electrical wire receiving grooves 92*b* are formed in the upper surface of the cutout surface 99.

As shown in FIG. 2, the covering end portion upper holding piece 87*a* comprises a fastening member 88 that extends in the left-right direction and a holding member 90 that is connected to the fastening member 88 via a linking member 89 that extends downward at an inclination. As shown in FIG. 3, the holding member 90 of the covering end portion upper holding piece 87*a* comprises a first holding member 96 that is formed on the rear side and a second holding member 97 that is formed on the front side.

A plurality of electrical wire retaining members (not shown) that face the electrical wire receiving grooves 92*b* of the covering end portion lower holding piece 87*b* are formed on the undersurface of the first holding member 96. The electrical wire retaining members of the first holding member 96 have substantially the same shape as the electrical wire retaining members 78 of the intermediate member upper holding piece 73*a*. Substantially circular arc-form recessed members 92*a* (FIG. 21) that are cut out in a substantially circular arc shape, as seen from the forward-rearward direction, are formed in the lower end portions of the electrical wire retaining members of the first holding member 96. The shape of the recessed members 92*a* is substantially the same as the shape of the recessed members 77*a* of the electrical wire retaining members 78 of the intermediate member upper holding piece 73*a*.

When the covering end portion upper holding piece 87*a* and the covering end portion lower holding piece 87*b* are closed, the lower end portions of the electrical wire retaining members of the first holding member 96 are inserted into the electrical wire receiving grooves 92*b* of the covering end portion lower holding piece 87*b*, and the recessed members 92*a* of the electrical wire retaining members hold from above the electrical wires W that are received in the electrical wire receiving grooves 92*b* of the covering end portion lower holding piece 87*b*. When the undersurface of the holding member 90 of the covering end portion upper holding piece 87*a* and the upper surface of the holding member 90 of the covering end portion lower holding piece 87*b* contact each other as a result of the covering end portion upper holding piece 87*a* and covering end portion lower holding piece 87*b* being closed, a plurality of holding apertures 91*b* (FIG. 21) that can hold the electrical wires W in a slidable manner are demarcated by the recessed members 92*a* in the first holding member 96 and the electrical wire receiving grooves 92*b* in the covering end portion lower holding piece 87*b*. The holding apertures 91*b* are designed such that central axes of the held electrical wires W can be positioned substantially coaxially with central axes of the cylindrical bodies 17 of the sealing member transfer device 10 that is located in the sealing member fitting position. The electrical wire covering end portion holding unit 74 is placed in a closed state as a result of the undersurface of the holding member 90 of the covering end portion upper holding piece 87*a* and the upper surface of the holding member 90 of the covering end portion lower holding piece 87b contacting each other when the covering end portion upper holding piece 87a and covering end portion lower holding piece 87b are closed.

A plurality of cylindrical body receiving grooves 94a (FIG. 21) that face the cylindrical body receiving grooves 94b of the covering end portion lower holding piece 87b are formed in the undersurface of the first holding member 96 to the rear side of the recessed members 92a of the electrical wire retaining members. When the undersurface of the holding member 90 of the covering end portion upper holding piece 87a and the upper surface of the holding member 90 of the covering end portion lower holding piece 87b contact each other, as a result of the covering end portion upper holding piece 87a and covering end portion lower holding piece 87b being closed, a plurality of cylindrical body receiving openings 91d (FIG. 21), which allow the insertion of the tip end portions of the cylindrical bodies 17 of the sealing member transfer device 10, are demarcated by the cylindrical body receiving grooves 94a in the first holding member 96 and the cylindrical body receiving grooves 94b in the covering end portion lower holding piece 87b. The cylindrical body receiving openings 91d are formed such that the central axes of the cylindrical body receiving openings 91d are substantially coaxial with the central axes of the cylindrical bodies 17 of the sealing member transfer device 10 that is located in the sealing member fitting position.

With regard to the second holding member 97, the undersurface thereof is formed substantially in a planar shape. The undersurface of the second holding member 97 is formed so as to face the cutout surface 99 of the covering end portion lower holding piece 87b. A plurality of substantially circular arc-form recessed members 99a (FIG. 21) that are cut out in a substantially circular arc shape as seen from the forward-rearward direction are formed in the undersurface of the second holding member 97. The shape of the recessed members 99a is substantially the same as the shape of the recessed members 77a of the electrical wire retaining members 78 of the intermediate member upper holding piece 73a. When the undersurface of the second holding member 97 of the covering end portion upper holding piece 87a and the cutout surface 99 of the covering end portion lower holding piece 87b contact each other as a result of the covering end portion upper holding piece 87a and covering end portion lower holding piece 87b being closed, a plurality of holding apertures 91c (FIG. 21) that can hold the electrical wires W in a slidable manner are demarcated by the recessed members 99a in the second holding member 97 and the electrical wire receiving grooves 99b in the cutout surface 99. The holding apertures 91c are designed such that the central axes of the held electrical wires W can be positioned substantially coaxially with the central axes of the cylindrical bodies 17 of the sealing member transfer device 10 that is located in the sealing member fitting position.

As shown in FIG. 2, the fastening member 88 of the covering end portion lower holding piece 87b is fastened to the electrical wire holding unit attachment plate 80b below the advancing and retracting rod insertion apertures 79. As a result, the covering end portion lower holding piece 87b is attached to the lower-side ascending and descending base member 72b. In the electrical wire insertion guide device 70 that is in the initial state, because the intermediate member lower holding piece 73b is driven in the direction of the electrical wire holding unit attachment plate 80b by the tension spring 85, the covering end portion lower holding piece 87b and intermediate member lower holding piece 73b are placed in a contacted state. In this case, the electrical wire receiving grooves 77b in the intermediate member lower holding piece 73b and the electrical wire receiving grooves 92b, 99b in the covering end portion lower holding piece 87b form a series of connected grooves.

The fastening member 88 of the covering end portion upper holding piece 87a is fastened to the electrical wire holding unit attachment plate 80a above the advancing and retracting rod insertion apertures 79. As a result, the covering end portion upper holding piece 87a is attached to the upper-side ascending and descending base member 72a. In the electrical wire insertion guide device 70 that is in the initial state, because the intermediate member upper holding piece 73a is driven in the direction of the electrical wire holding unit attachment plate 80a by the tension spring, the covering end portion upper holding piece 87a and the intermediate member upper holding piece 73a are placed in a contacted state. In this case, the recessed members 77a in the intermediate member upper holding piece 73a and the recessed members 92a, 99a in the covering end portion upper holding piece 87a form a series of connected recessed members.

The covering end portion upper holding piece 87a and the intermediate member upper holding piece 73a are simultaneously raised or lowered as a result of the ascending and descending base member 72a being raised or lowered by the upper-side ascending and descending cylinder 76. Likewise, the covering end portion lower holding piece 87b and the intermediate member lower holding piece 73b are allowed to be simultaneously raised or lowered as a result of the ascending and descending base member 72b being raised or lowered by the lower-side ascending and descending cylinder 76. The electrical wire intermediate member holding unit 73 and the electrical wire covering end portion holding unit 74 are placed in an open state as a result of the covering end portion upper holding piece 87a and the intermediate member upper holding piece 73a being raised and the covering end portion lower holding piece 87b and the intermediate member lower holding piece 73b being lowered. The electrical wire intermediate member holding unit 73 and the electrical wire covering end portion holding unit 74 are placed in a closed state as a result of the covering end portion upper holding piece 87a and the intermediate member upper holding piece 73a being lowered and the covering end portion lower holding piece 87b and the intermediate member lower holding piece 73b being raised.

The electrical wire intermediate member holding unit 73 and the electrical wire covering end portion holding unit 74 are simultaneously advanced or retracted as a result of the advancing and retracting base 71 being advanced or retracted by the advancing and retracting cylinder 75. The electrical wire intermediate member holding unit 73 is moved toward the front with respect to the electrical wire covering end portion holding unit 74 that is fastened to the ascending and descending base members 72a, 72b as a result of the pushing pins 83 of the pushing plates 84 being pushed in forward by the push-in piece 82.

Figure 7:
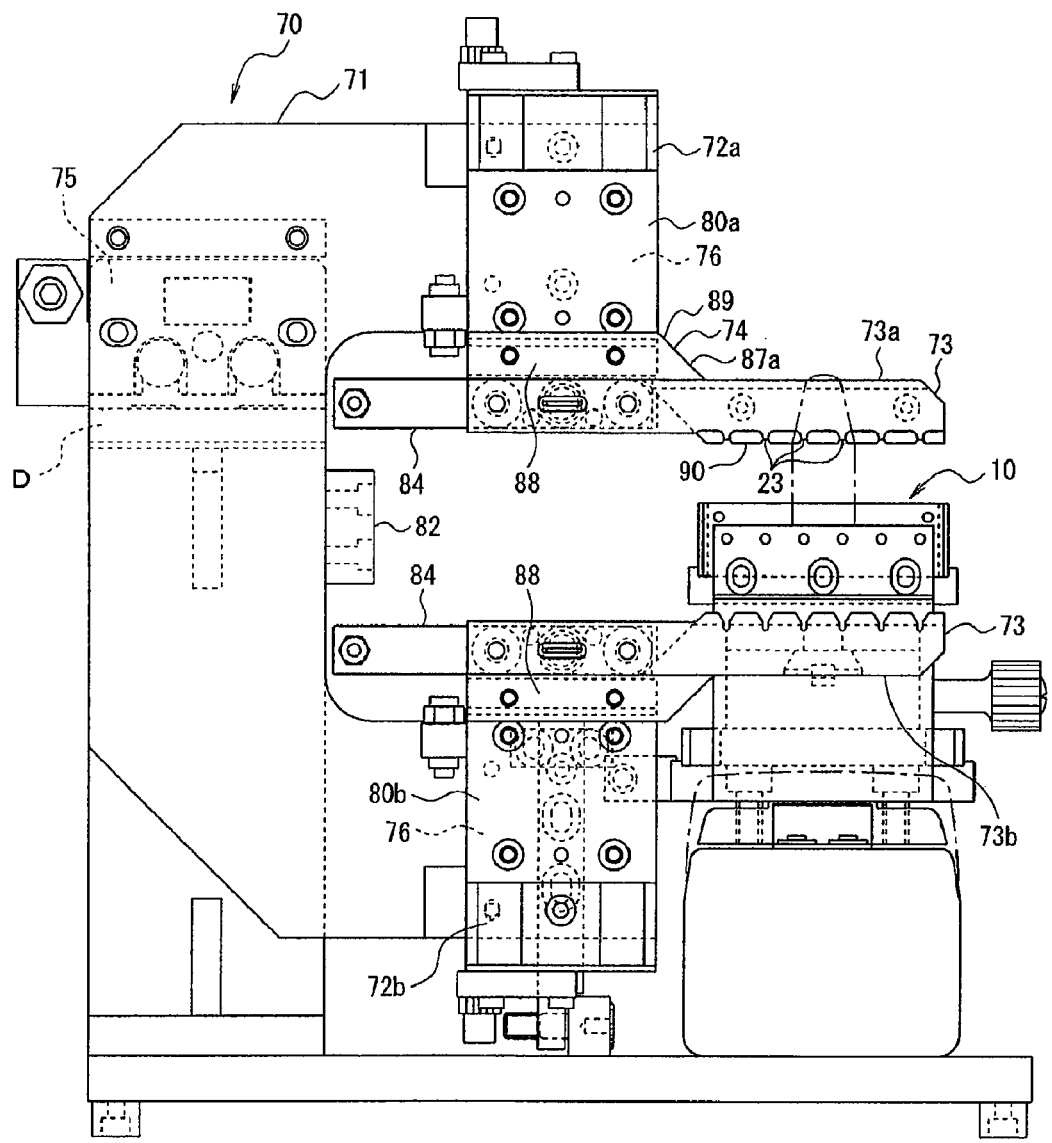
FIG. 7 is a schematic front view of the electrical wire insertion guide device shown in an electrical wire holding position.
Figure 8:
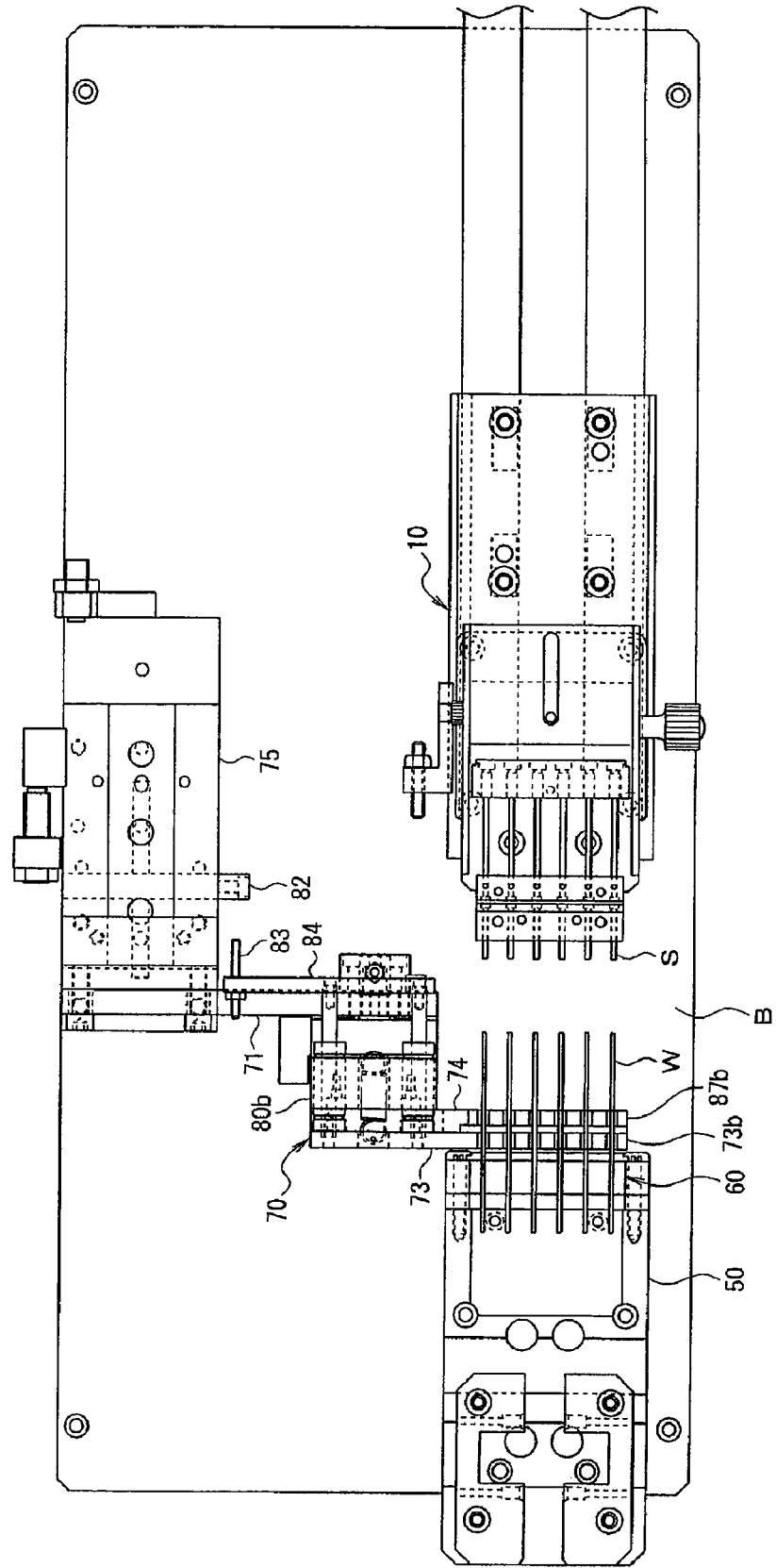
FIG. 8 is a schematic plan view of the electrical wire insertion guide device shown in FIG. 7.

In the electrical wire insertion guide device 70 that is in the initial state, the electrical wire intermediate member holding unit 73 and the electrical wire covering end portion holding unit 74 are in an open state, as shown in FIG. 7. In the electrical wire insertion guide device 70 that is in the initial state, the advancing and retracting base 71 is located in the advanced position, and the electrical wire intermediate member holding unit 73 and the electrical wire covering end portion holding unit 74 are disposed as an integral unit in the electrical wire holding position to the rear side of the electrical wire clamping device 60, as shown in FIG. 8. In this case, the covering end portion lower holding piece 87b and the intermediate member lower holding piece 73b are disposed underneath the electrical wires W that are led out from the electrical wire clamping device 60, and the electrical wire receiving grooves 77b in the intermediate member lower holding piece 73b are disposed underneath the lead-out members of the electrical wires from the electrical wire clamping member 62. Likewise, the covering end portion upper holding piece 87a and the intermediate member upper holding piece 73a are disposed above the electrical wires W that are led out from the electrical wire clamping device 60, and the recessed members 77a in the intermediate member upper holding piece 73a are disposed above the lead-out members of the electrical wires from the clamping member 62. As a result of the advancing and retracting base 71 being in the advanced position, the covering end portion lower holding piece 87b and the intermediate member lower holding piece 73b contact each other and are placed in an integrated state, and the covering end portion upper holding piece 87a and the intermediate member upper holding piece 73a contact each other and are placed in an integrated state.

A method for fitting the sealing member S on the covering end portions of the electrical wires W will now be described in detail with reference to the figures. As shown in FIGS. 9A-9B, in the initial state in which one of the sealing member transfer devices 10 is located in the sealing member receiving position which faces the sealing member holding device 30, a plurality of the sealing members S that have been sent from the sealing member supply source (not shown) are held inside the through-apertures 31a in the sealing member holder 31. The first member 13, the cylindrical bodies 17, and the seal pressing member 32 are located in the retracted position, and the guide members 20 are located in the advanced position.

The first member 13 then advances, as shown in FIGS. 10A-10B. As a result, the front end surface of the first member 13 contacts the front end surface of the sealing member holder 31. The seal pressing member 32 then advances, as shown in FIGS. 11A-11B. As a result, the front end surfaces of the pressing members 32a press the rear end surfaces of the sealing members S, so that the front portions of the sealing members S enter the sealing member receiving recessed members 13b of the first member 13.

Figures 12A, 12B:
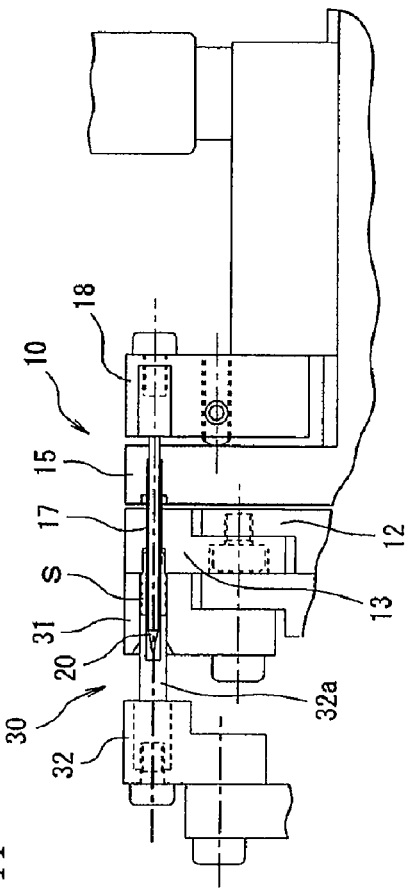
FIG. 12A is a schematic diagram of the sealing member holding device and the sealing member transfer device showing a state in which guide members and cylindrical bodies have advanced from the state shown in FIG. 11A.
FIG. 12B is a schematic sectional view of elements of the sealing member holding device and the sealing member transfer device shown in FIG. 12A.

The guide members 20 and the cylindrical bodies 17 then advance, as shown in FIGS. 12A-12B. As a result, the guide members 20 and cylindrical bodies 17 enter the sealing member openings Sa of the sealing members S that are held in the sealing member holder 31, and receive and hold the sealing members S on the outer circumferential surfaces of the cylindrical bodies 17. Because the front ends of the guide members 20 are formed as substantially tapered circular conic-shaped guide members, the guide members 20 press-open the sealing member openings Sa of the sealing members S while the guide members 20 and cylindrical bodies 17 enter the sealing member-openings Sa of the sealing members S, making this entry to be performed smoothly. Because the rear end surfaces of the sealing members S are pressed by the pressing members 32a of the seal pressing member 32, the sealing members S are prevented from being pushed out of the sealing member holder 31.

Figure 13A:
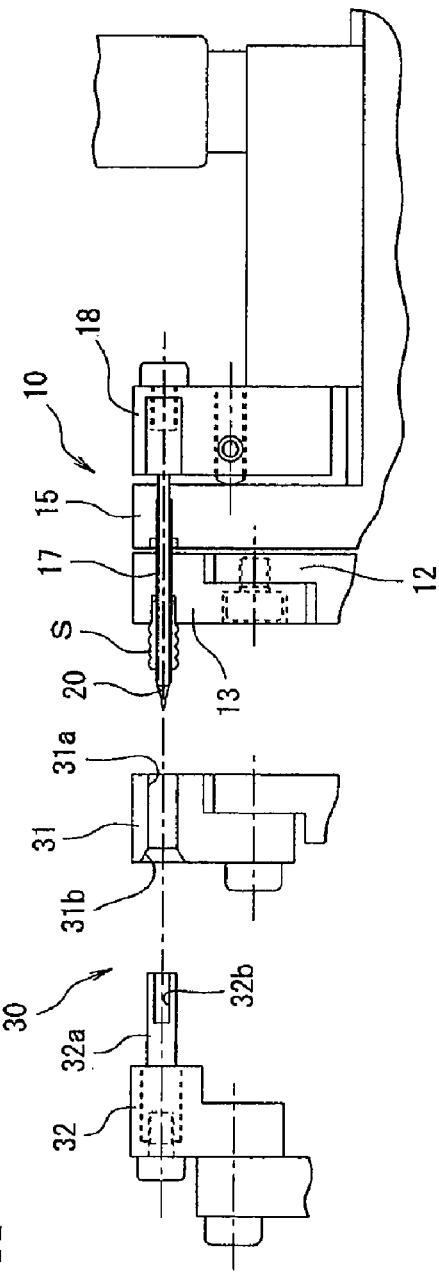
FIG. 13A is a schematic diagram of the sealing member holding device and the sealing member transfer device showing a state in which the first member has retracted from the state shown in FIG. 12A.
Figure 13B:
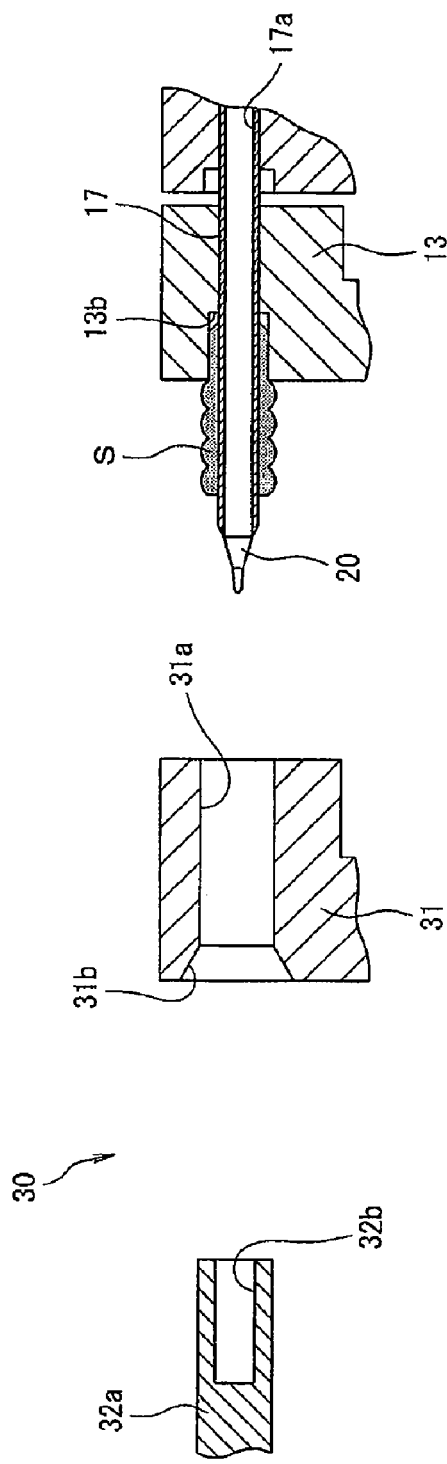
FIG. 13B is a schematic sectional view of elements of the sealing member holding device and the sealing member transfer device shown in FIG. 13A.
Figure 14A:
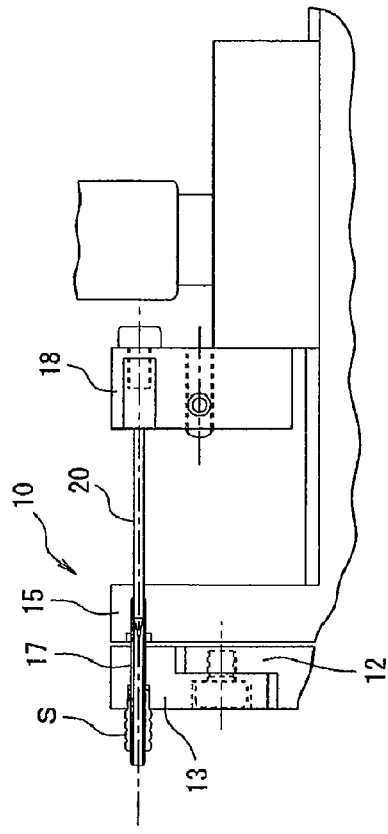
FIG. 14A is a schematic diagram of the sealing member holding device showing a state in which the sealing member holding device is located in a sealing member fitting position.
Figure 14B:
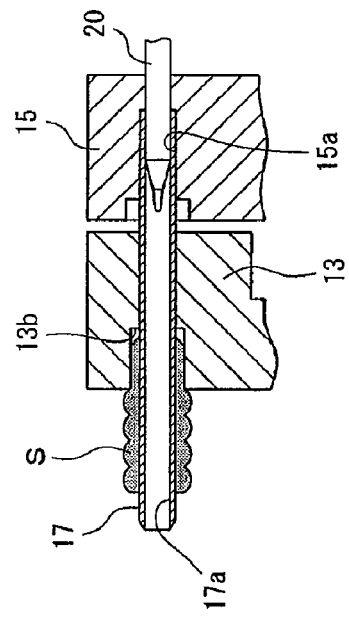
FIG. 14B is a schematic sectional view of elements of the sealing member holding device shown in FIG. 14A.

The first member 13 then retracts, as shown in FIGS. 13A-13B. The guide members 20 also retract, as shown in FIGS. 14A-14B, while the position of the sealing member transfer device 10 is switched to the sealing member fitting position. In this case, the sealing members S are still held on the outer circumferential surfaces of the cylindrical bodies 17. When the position of each of the sealing member transfer devices 10 is switched to the sealing member fitting position, the base plate 11 pivots about 180 degrees clockwise or counterclockwise in the direction indicated by the arrow in FIG. 1.

Meanwhile, in the initial state in which the sealing member transfer device 10 shown in FIGS. 14A-14B is located in the sealing member fitting position, the electrical wire supporting member 40 is supported by the support member 51 of the electrical wire supporting member setting jig 50, and the electrical wires W are disposed such that a vicinity of the covering end portions thereof are clamped by the electrical wire clamping device 60, as shown in FIG. 15. The electrical wires W are clamped by the electrical wire clamping device 60 in a state in which the tip end members are caused to protrude rearward from the clamping member 62.

As shown in FIGS. 8 and 15, the electrical wire insertion guide device 70 is disposed in the electrical wire holding position in the initial state. In the initial state, the electrical wire receiving grooves 77b (FIG. 2) in the intermediate member lower holding piece 73b are disposed underneath the lead-out members of the electrical wires W from the clamping member 62, and the recessed members 77a (FIG. 2) of the intermediate member upper holding piece 73a are disposed above the lead-out members of the electrical wires W from the electrical wire clamping member 62.

Figure 16:
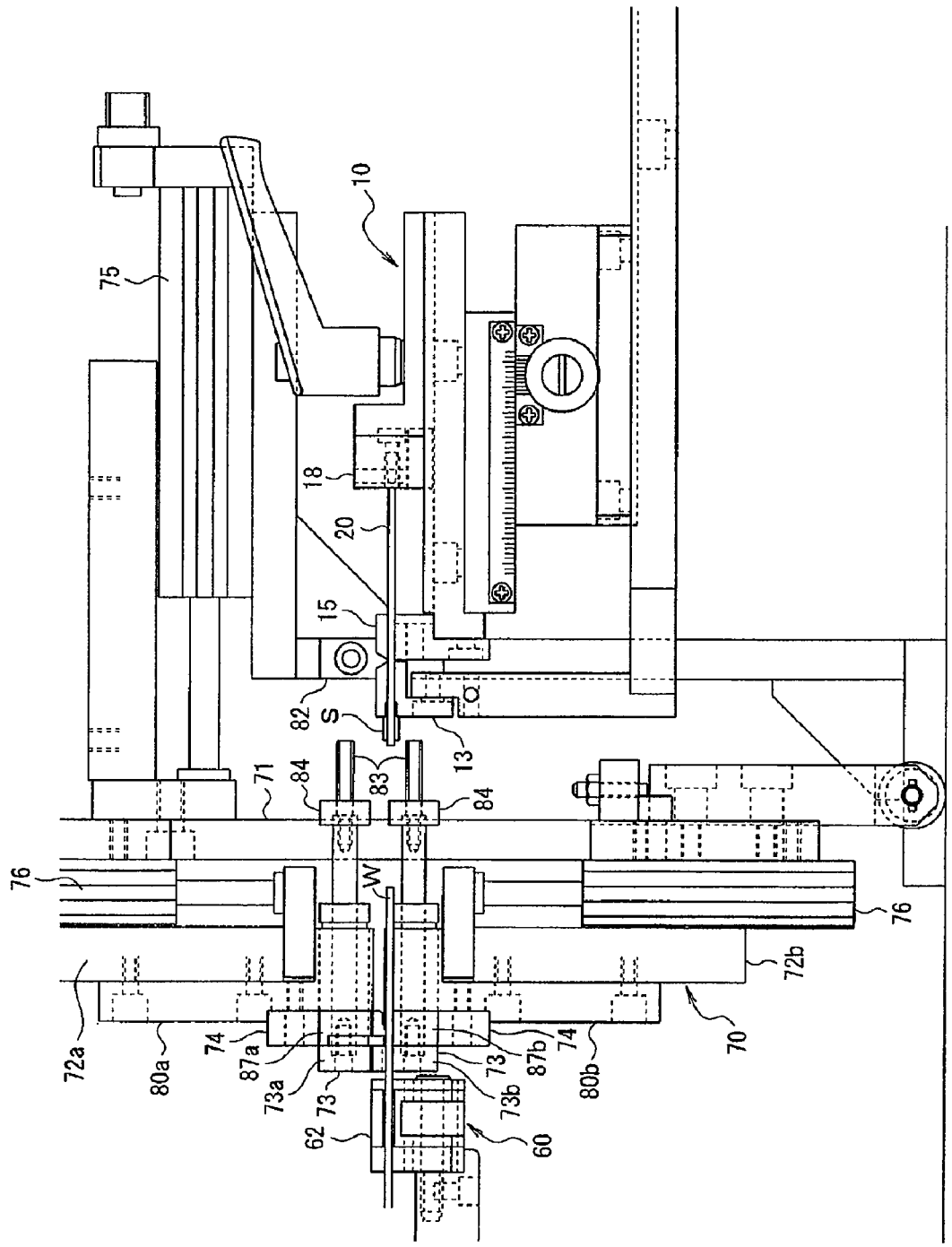
FIG. 16 is a schematic side view of the sealing member transfer device, the electrical wire clamping device, and the electrical wire insertion guide device showing an electrical wire covering end portion holding unit and an electrical wire intermediate member holding unit in a closed state.
Figure 17:
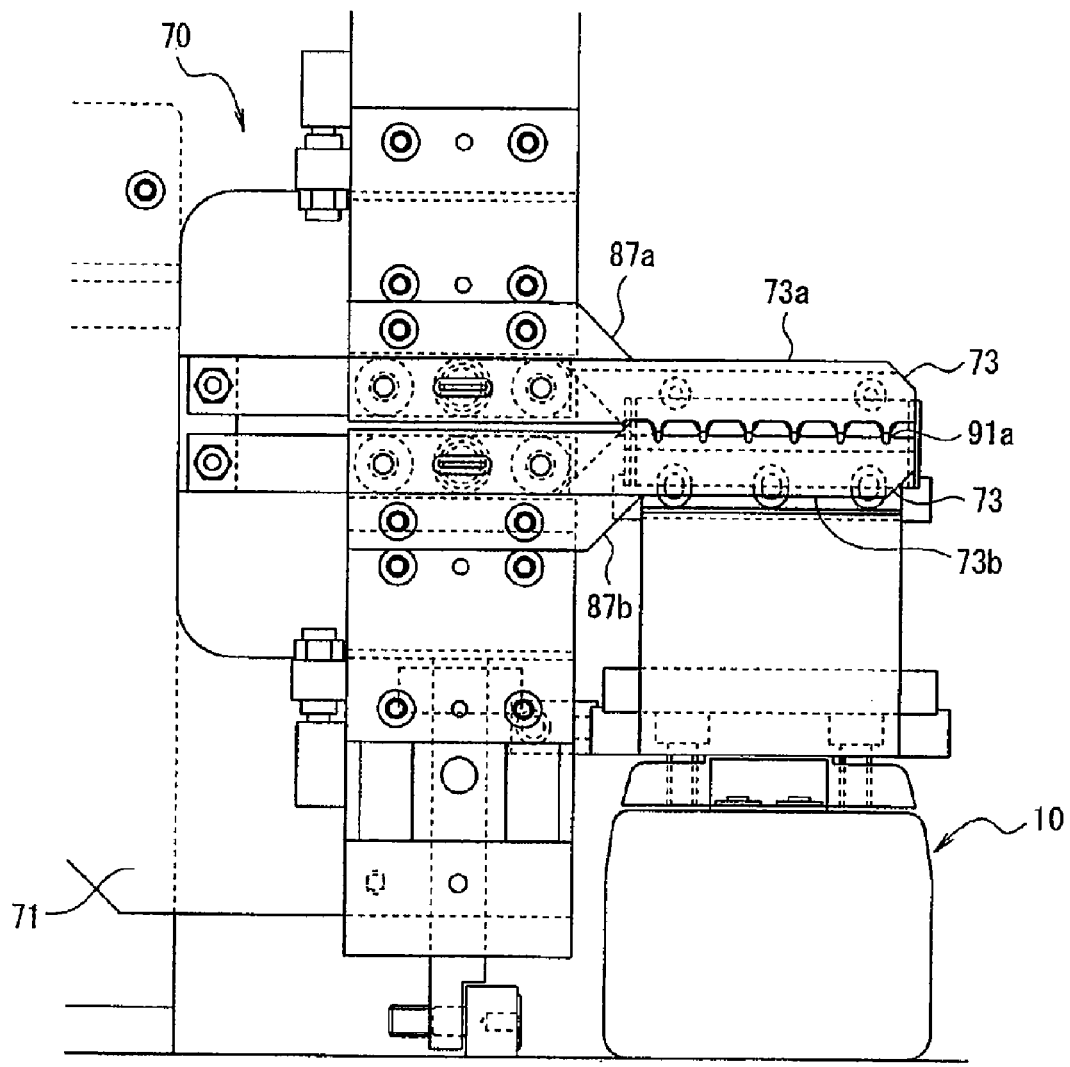
FIG. 17 is a schematic front view of the sealing member transfer device, the electrical wire clamping device, and the electrical wire insertion guide device shown in FIG. 16.

Next, as shown in FIGS. 16-17, the covering end portion upper holding piece 87a and the intermediate member upper holding piece 73a descend, and the covering end portion lower holding piece 87b and the intermediate member lower holding piece 73b ascend. As a result, the electrical wire intermediate member holding unit 73 and the electrical wire covering end portion holding unit 74 are closed. In this case, the intermediate member upper holding piece 73a and the intermediate member lower holding piece 73b are positioned immediately behind the rear end surface of the clamping member 62 of the electrical wire clamping device 60. Consequently, of the electrical wires W that are clamped in the electrical wire clamping device 60, the members that are led out from the clamping member 62 are held by the electrical wire intermediate member holding unit 73 and the electrical wire covering end portion holding unit 74.

Here, the pitch of the covering end portions of the electrical wires W that are led out from the clamping member 62 of the electrical wire clamping device 60 is irregular because the electrical wires hang down toward the bottom or the like. This becomes particularly prominent in cases where the external diameter of the electrical wires W is small. In contrast, the pitch of the lead-out members from the clamping member 62 of the electrical wires W that are held in the electrical wire clamping device 60 is the same as the specified pitch at which the clamping member 62 holds the electrical wires W.

Therefore, by holding the electrical wires W at the lead-out members of the electrical wires W from the clamping device 60 with the pitch thereof being established, the electrical wires can be automatically held in a reliable manner even in cases where the external diameter of the electrical wires W is small. In this case, the holding apertures 91a in the electrical wire intermediate member holding unit 73 and the holding apertures 91b, 91c in the electrical wire covering end portion holding unit 74 are placed in a state in which the holding apertures 91a, 91b, 91c form a series of connected apertures, thus holding the electrical wires W in a slidable manner. Then, the electrical wire intermediate member holding unit 73 and the electrical wire covering end portion holding unit 74 perform the positioning of the held electrical wires W such that the central axes of the electrical wires W are substantially coaxial with the central axes of the cylindrical bodies 17 of the sealing member transfer device 10 that is located in the sealing member fitting position.

Figure 18:
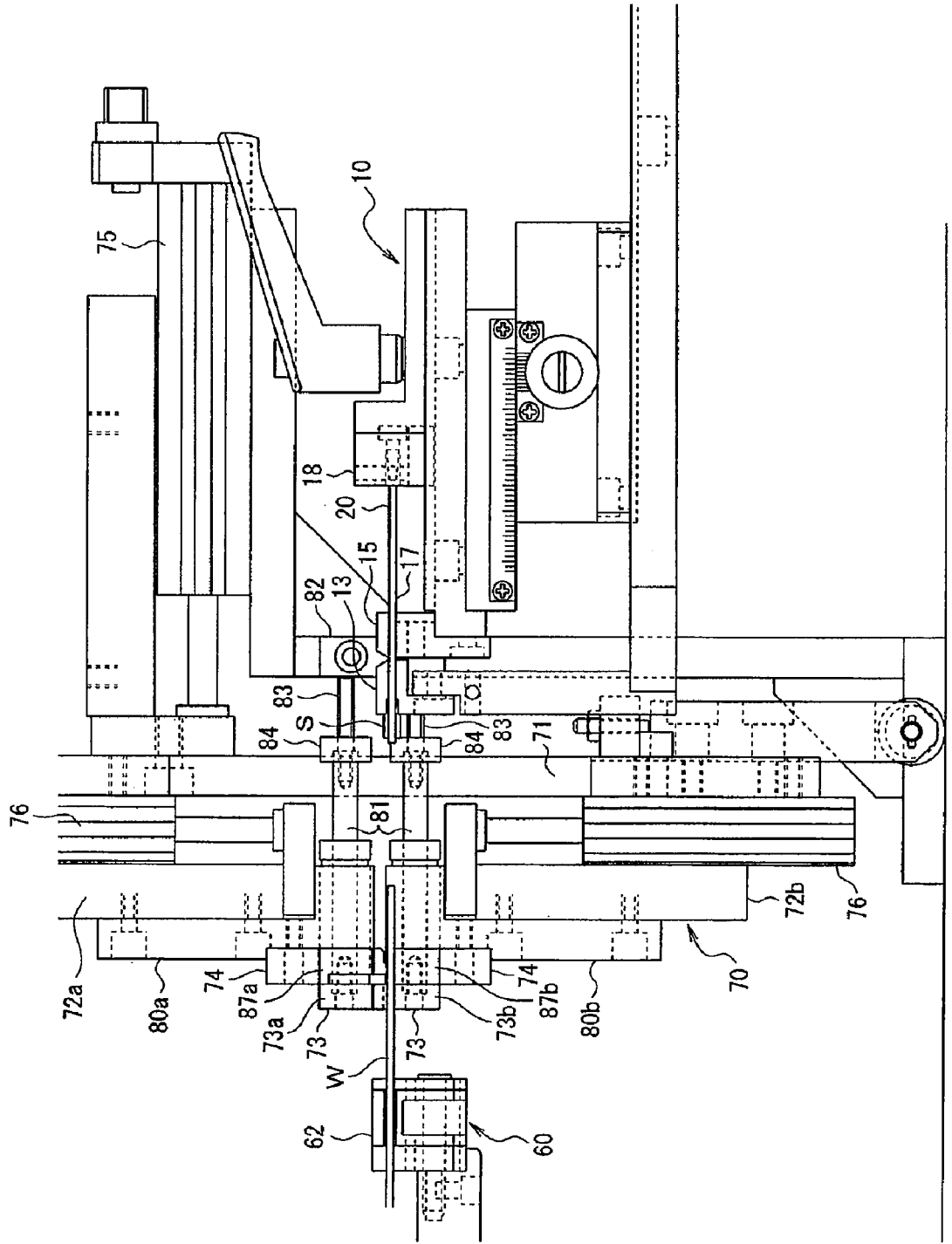
FIG. 18 is a schematic side view of the sealing member transfer device, the electrical wire clamping device, and the electrical wire insertion guide device showing the electrical wire covering end portion holding unit and the electrical wire intermediate member holding unit retracted from the state shown in FIG. 16.

The advancing and retracting base 71 then retracts, as shown in FIG. 18. As a result, the end surfaces of the pushing pins 83 of the electrical wire intermediate member holding unit 73 contact the push-in piece 82. In this case, because the electrical wire intermediate member holding unit 73 and the electrical wire covering end portion holding unit 74 hold the electrical wires W in a slidable manner, the positions where the electrical wires W are held by the electrical wire intermediate member holding unit 73 and the electrical wire covering end portion holding unit 74 move toward the covering end portions of the electrical wires W. Then, the electrical wire intermediate member holding unit 73 and the electrical wire covering end portion holding unit 74 are moved to the area between the electrical wire clamping device 60 and the sealing member fitting position, and therefore hold the portions of the electrical wires W between the lead-out members from the clamping member 62 and the covering end portions. The electrical wire intermediate member holding unit 73 and the electrical wire covering end portion holding unit 74 are moved to substantially the central portion between the electrical wire clamping device 60 and the sealing member fitting position, and therefore hold substantially the central portions of the electrical wires W between the lead-out members from the clamping member 62 and the covering end portions.

Figure 19:
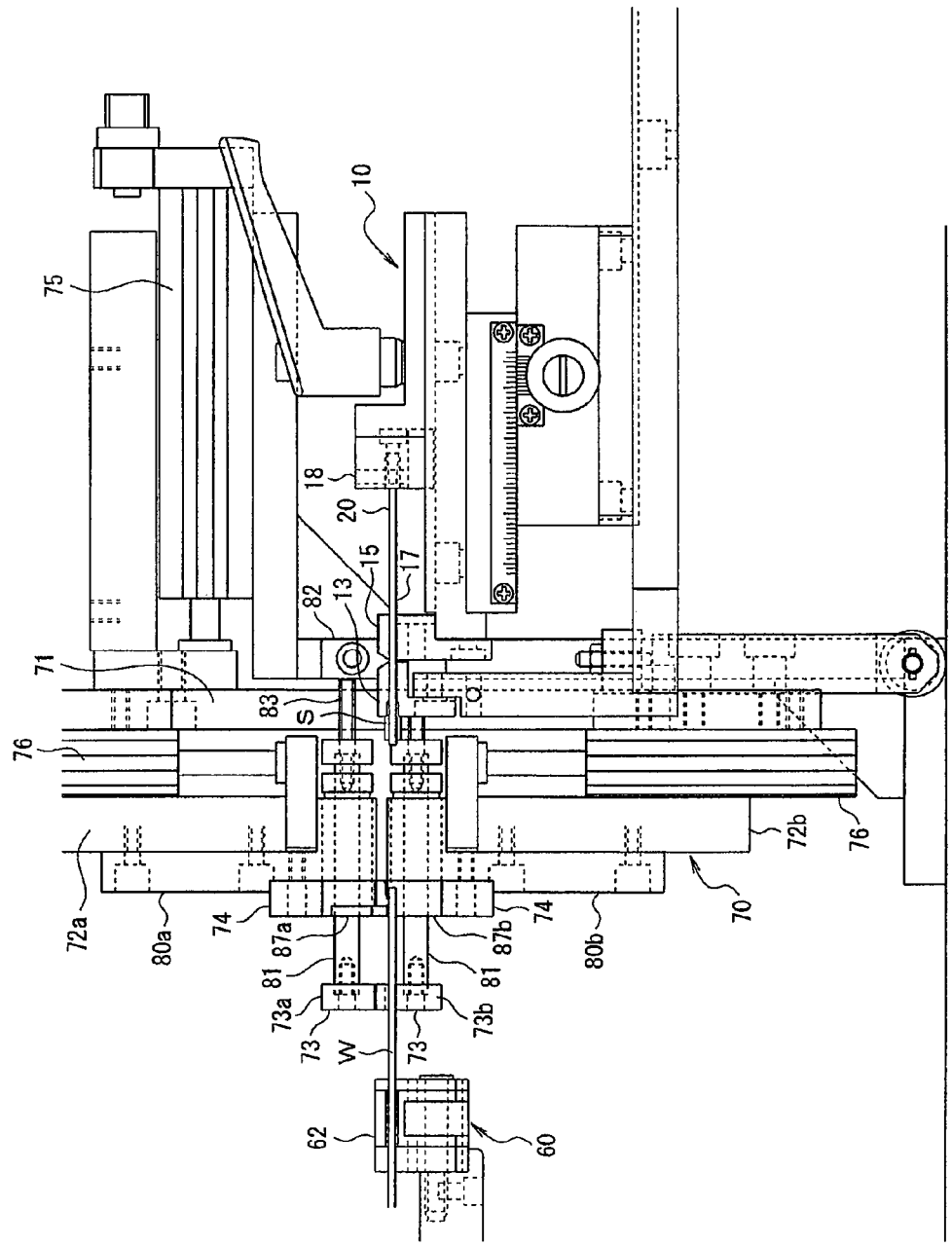
FIG. 19 is a schematic side view of the sealing member transfer device, the electrical wire clamping device, and the electrical wire insertion guide device showing the electrical wire covering end portion holding unit retracted from the state shown in FIG. 18 and the electrical wire insertion guide device located in the sealing member fitting position.

The advancing and retracting base 71 then retracts further, as shown in FIG. 19. This causes the pushing pins 83 to be pushed forward by the push-in piece 82, so that only the electrical wire covering end portion holding unit 74 retracts in a state in which the retraction of the electrical wire intermediate member holding unit 73 is stopped. In this case, the electrical wire covering end portion holding unit 74 is moved to the sealing member fitting position and holds the covering end portions of the electrical wires W. As a result, the electrical wire intermediate member holding unit 73 and the electrical wire covering end portion holding unit 74 hold the electrical wires W in a state in which each of the electrical wires W is made into a substantially straight line and perform the positioning of the held electrical wires W such that the central axes of the electrical wires W are substantially coaxial with the central axes of the cylindrical bodies 17 of the sealing member transfer device 10 that is located in the sealing member fitting position. Consequently, the electrical wire covering end portion holding unit 74 can accurately perform the positioning of the covering end portions of the electrical wires W with respect to the cylindrical bodies 17 holding the sealing members S.

Figure 20:
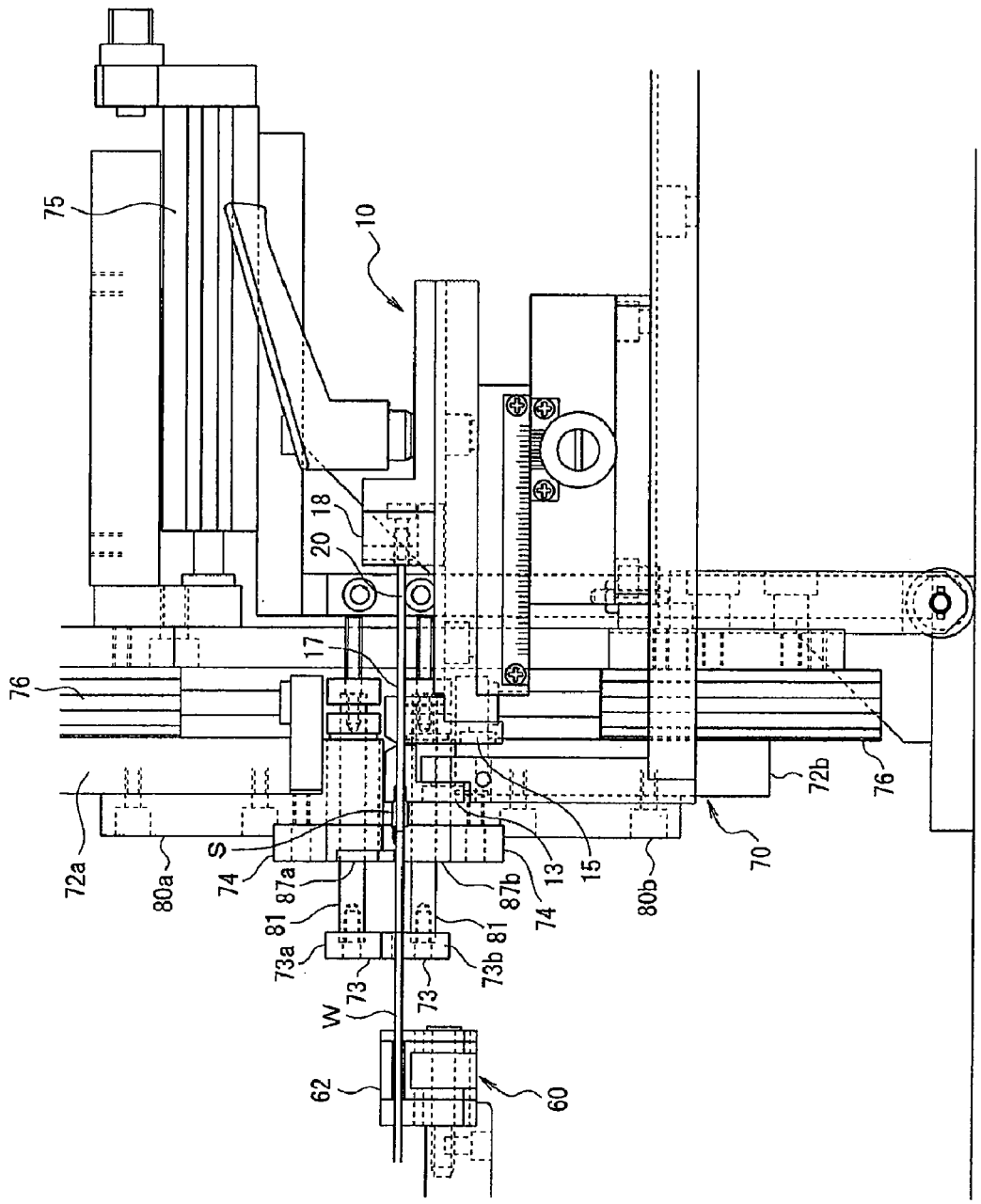
FIG. 20 is a schematic side view of the sealing member transfer device, the electrical wire clamping device, and the electrical wire insertion guide device showing the sealing member transfer device advanced from the state shown in FIG. 19.
Figure 21:
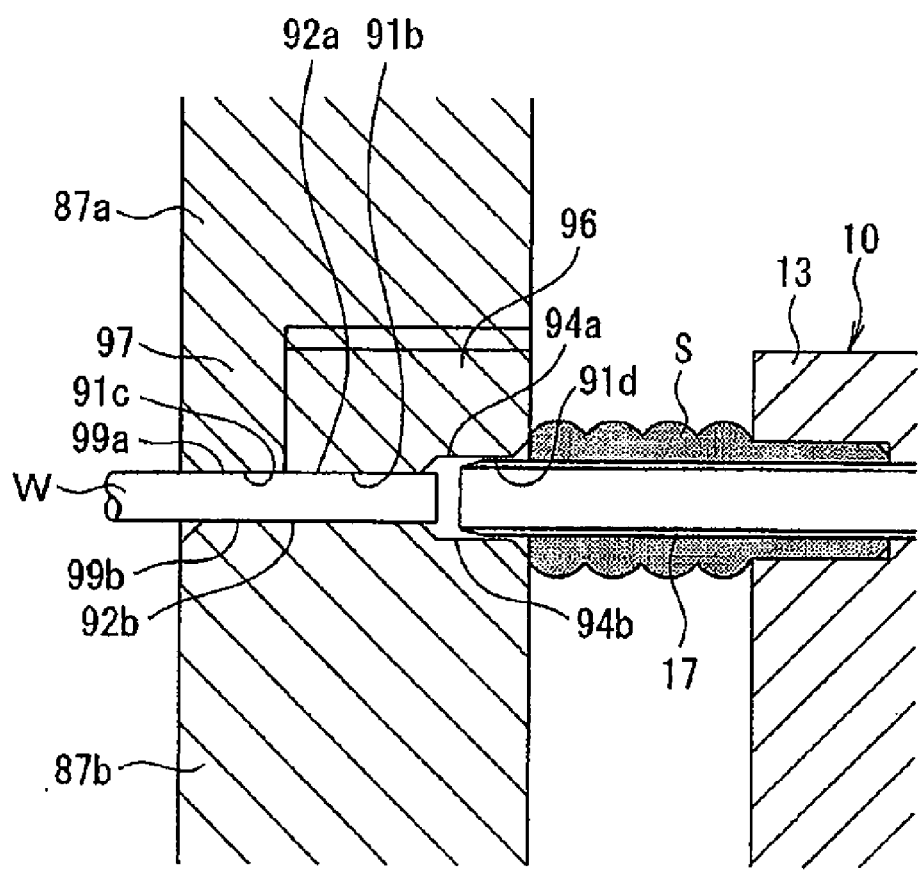
FIG. 21 is a schematic sectional view of elements of the sealing member transfer device, the electrical wire clamping device, and the electrical wire insertion guide device shown in FIG. 20.
Figure 22:
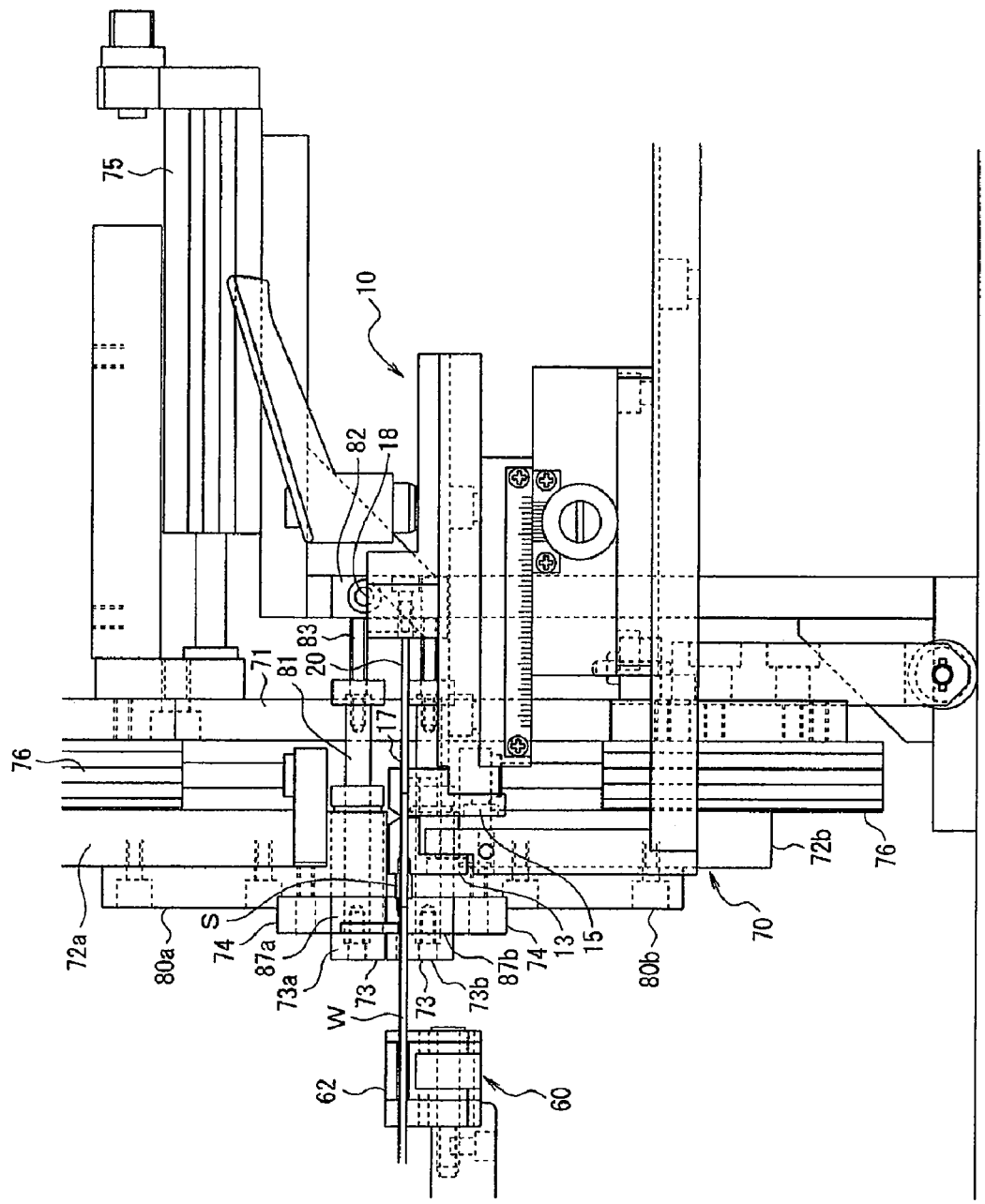
FIG. 22 is a schematic side view of the sealing member transfer device, the electrical wire clamping device, and the electrical wire insertion guide device showing the sealing member transfer device advanced from the state shown in FIG. 20.

As shown in FIGS. 20-21, the first member 13 advances again accompanied by the sealing members S and the cylindrical bodies 17. As a result, the tip end portions of the cylindrical bodies 17 are inserted into the cylindrical body receiving openings 91d in the electrical wire covering end portion holding unit 74. Moreover, the first member 13 advances further accompanied by the sealing members S and the cylindrical bodies 17, as shown in FIG. 22. Consequently, the tip end portions of the cylindrical bodies 17 push the electrical wire covering end portion holding unit 74 forward. In this case, the position where each of the electrical wires W is held by the electrical wire covering end portion holding unit 74 is moved to the area between the member led out from the clamping member 62 and the covering end portion, so that the covering end portions of the electrical wires W are received inside the cylindrical bodies 17.

Figure 23:
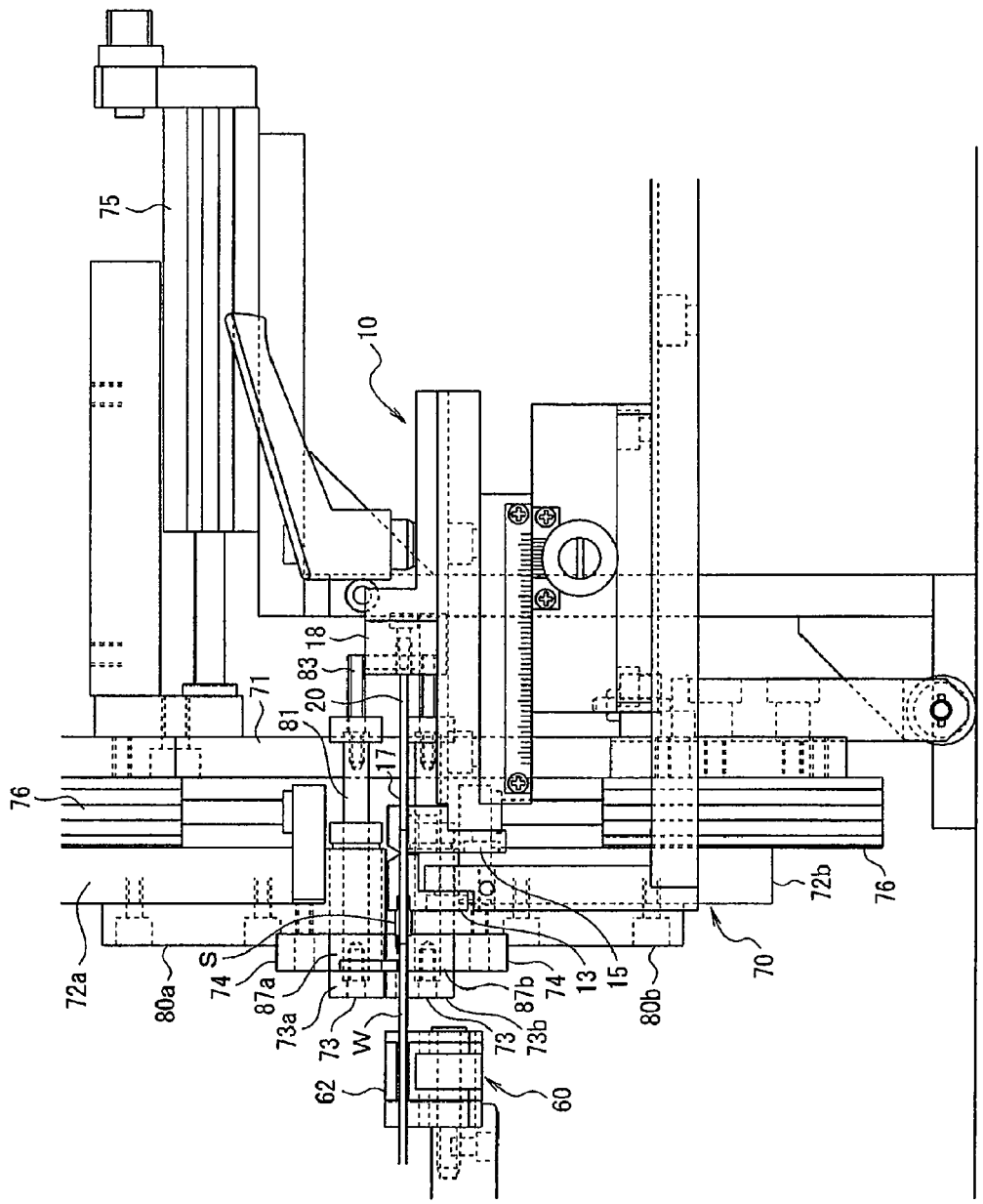
FIG. 23 is a schematic side view of the sealing member transfer device, the electrical wire clamping device, and the electrical wire insertion guide device showing the sealing member transfer device advanced further from the state shown in FIG. 22.
Figure 24:
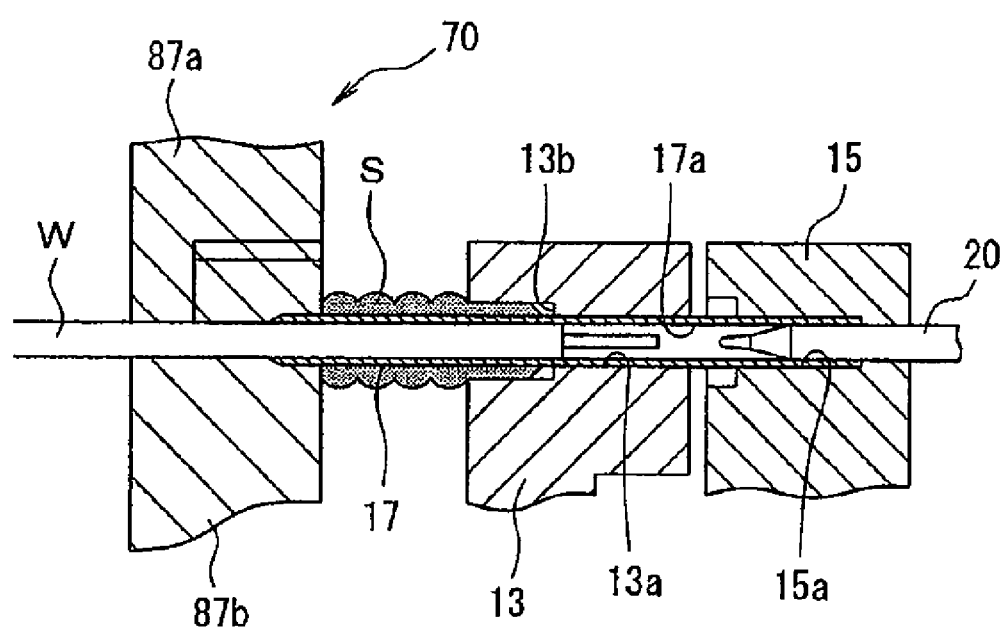
FIG. 24 is a sectional view of elements of the sealing member transfer device, the electrical wire clamping device, and the electrical wire insertion guide device shown in FIG. 23.

The first member 13 advances further accompanied by the sealing members S and the cylindrical bodies 17, as shown in FIG. 23. As a result, the tip end portions of the cylindrical bodies 17 push the electrical wire covering end portion holding unit 74 and the electrical wire intermediate member holding unit 73 forward. Consequently, the positions where each of the electrical wires W is held by the electrical wire covering end portion holding unit 74 and the electrical wire intermediate member holding unit 73 are moved further toward the member led out from the clamping member 62. Then, as shown in FIG. 24, the covering end portions of the electrical wires W are inserted into the cylindrical bodies 17 to a position that allows the fitting of the sealing members S that are held on the outer circumferential surfaces of the cylindrical bodies 17.

Figure 25:
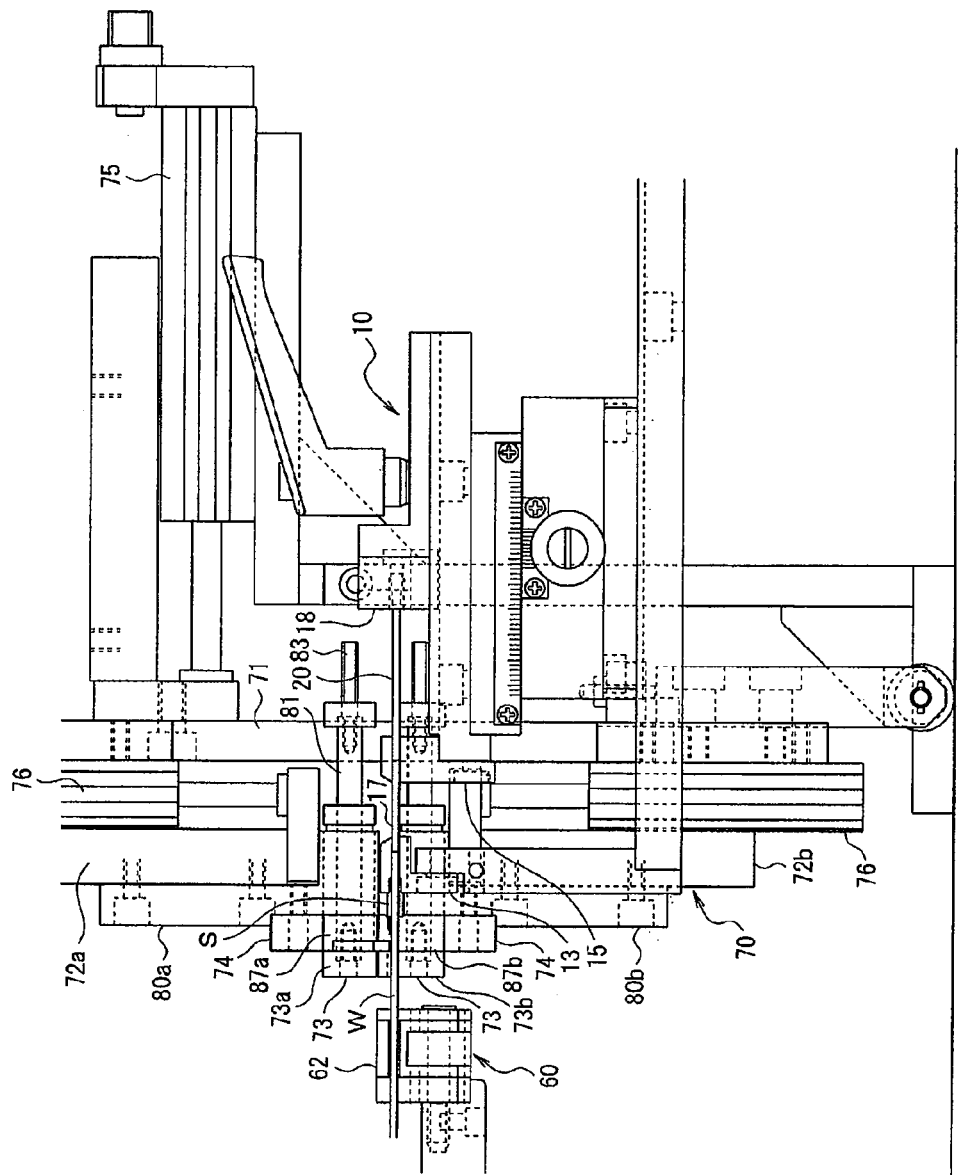
FIG. 25 is a schematic side view of the sealing member transfer device, the electrical wire clamping device, and the electrical wire insertion guide device showing the cylindrical bodies of the sealing member transfer device retracted from the state shown in FIG. 23.
Figure 26:
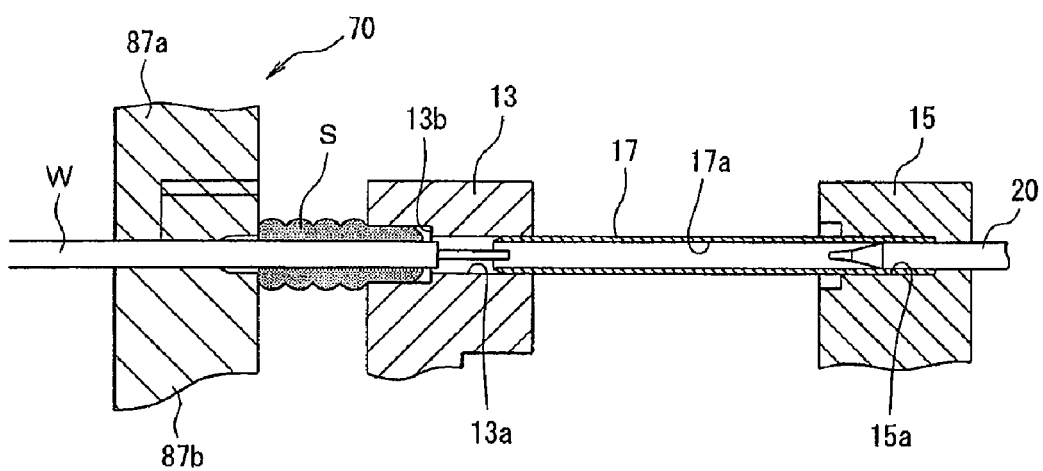
FIG. 26 is a schematic sectional view of elements of the sealing member transfer device, the electrical wire clamping device, and the electrical wire insertion guide device shown in FIG. 25.
Figure 27:
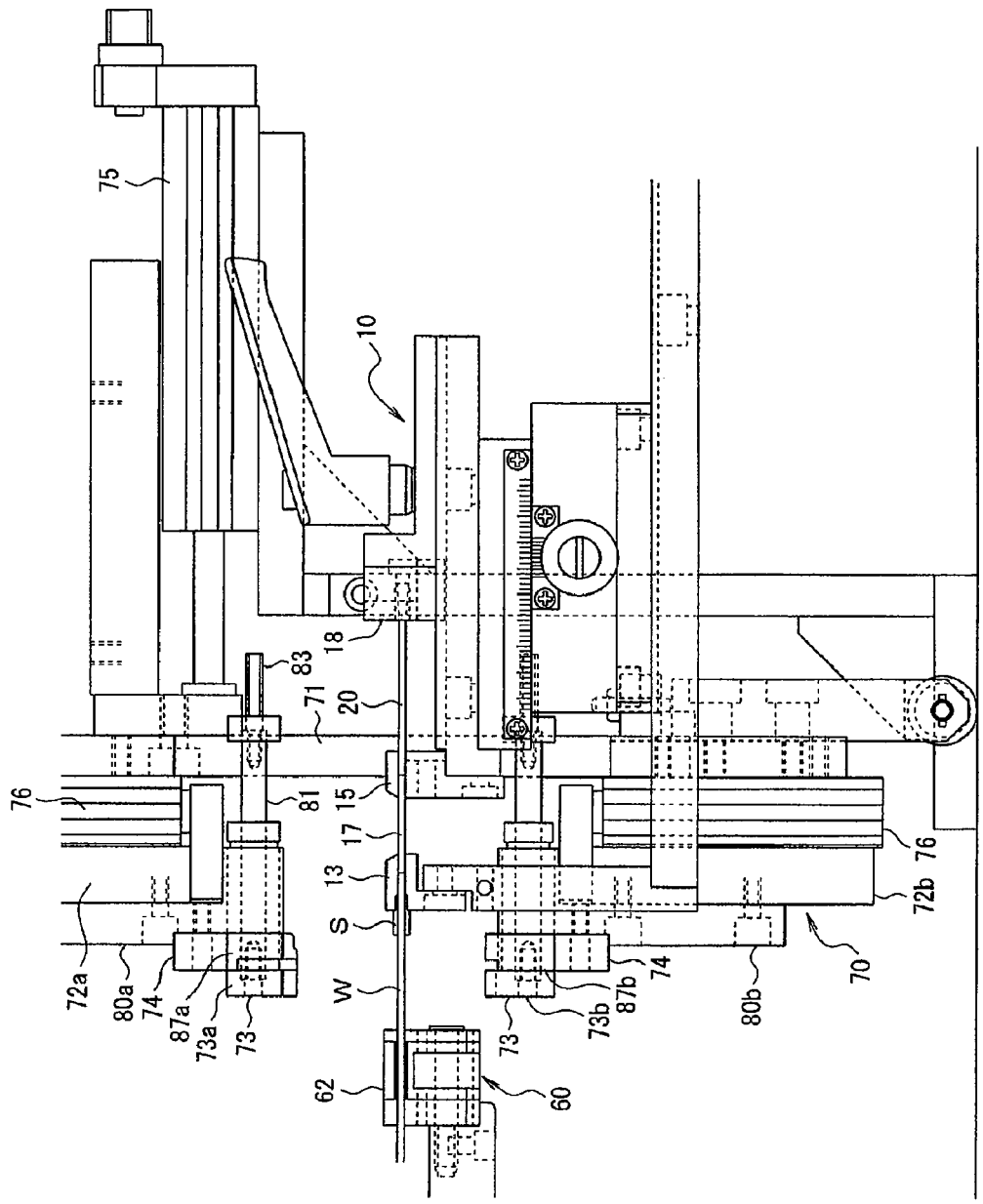
FIG. 27 is a schematic side view of the sealing member transfer device, the electrical wire clamping device, and the electrical wire insertion guide device showing electrical wire covering end portion holding unit and the electrical wire intermediate member holding unit opened from the state shown in FIG. 25.
Figure 28:
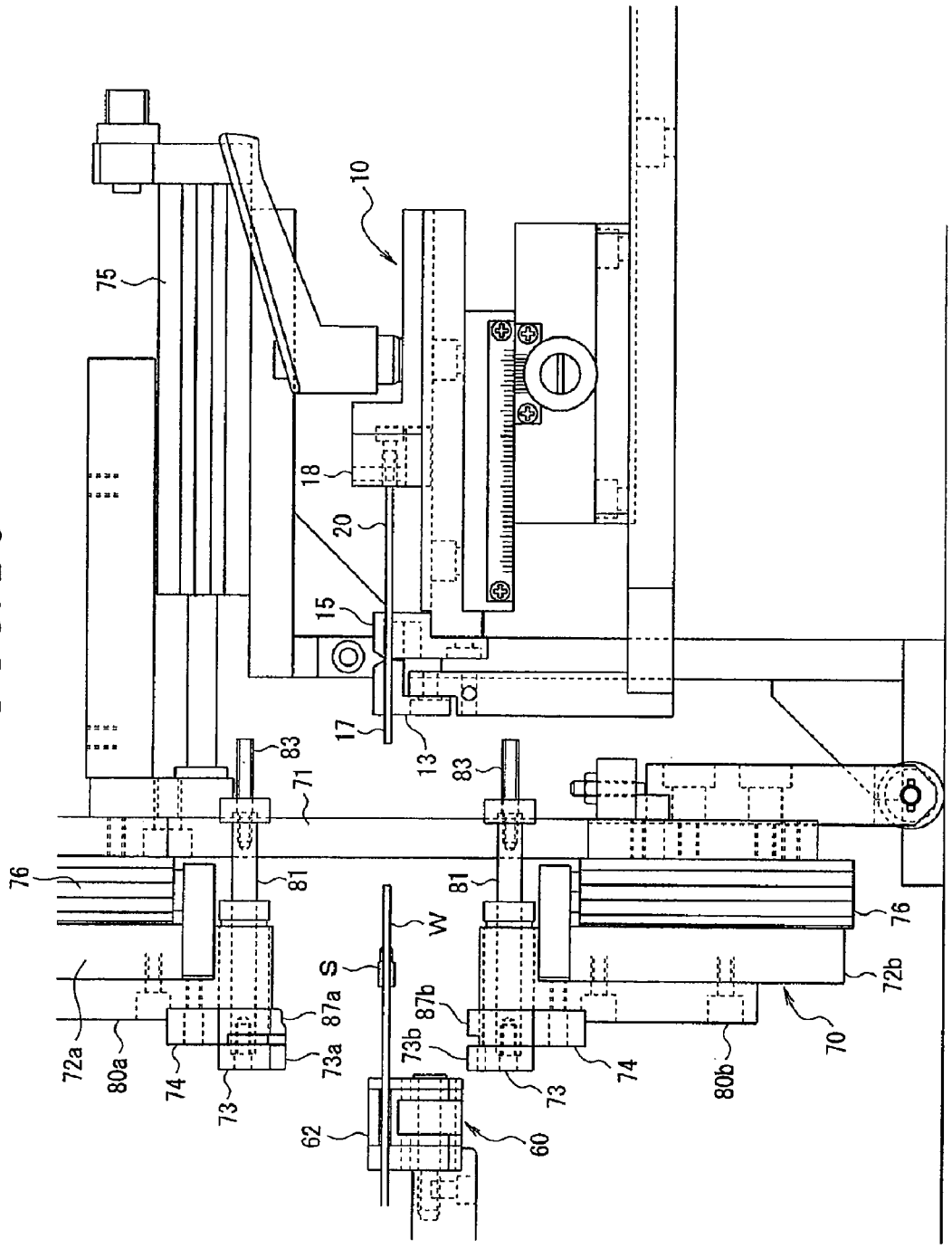
FIG. 28 is a schematic side view of the sealing member transfer device, the electrical wire clamping device, and the electrical wire insertion guide device showing the first member of the sealing member transfer device retracted from the state shown in FIG. 27.
Figure 29:
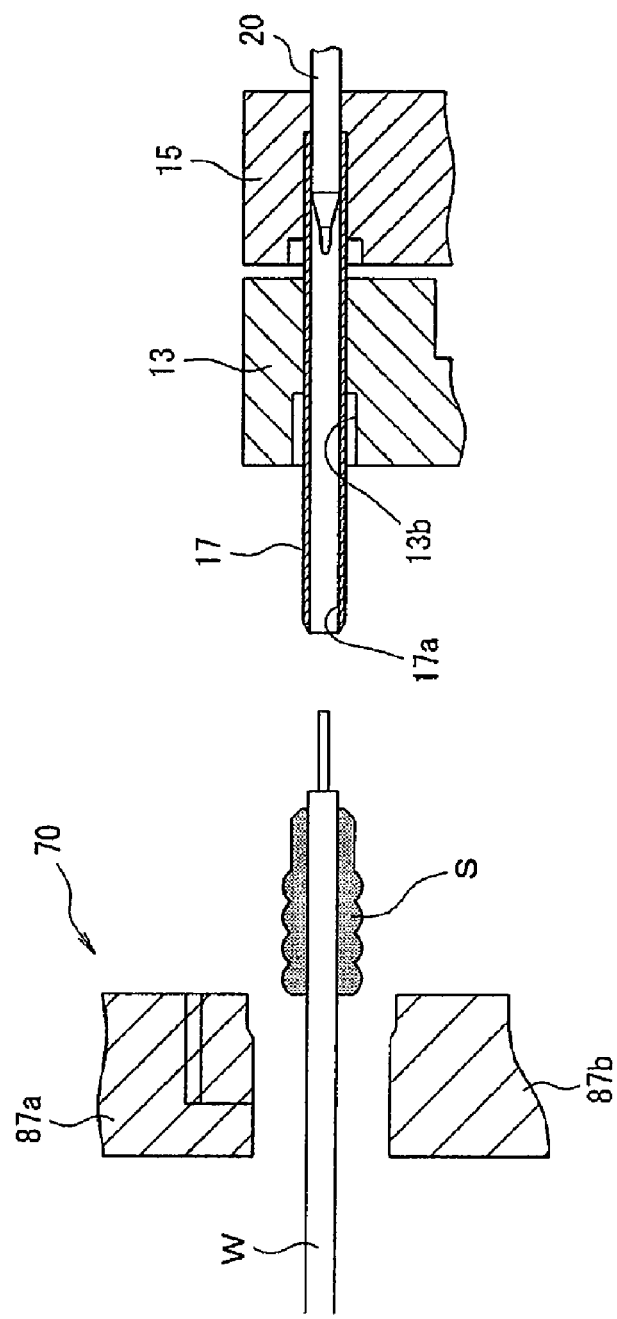
FIG. 29 is a schematic sectional view of elements of the sealing member transfer device, the electrical wire clamping device, and the electrical wire insertion guide device shown in FIG. 28.

Subsequently, only the cylindrical bodies 17 retract into the first member 13, as shown in FIGS. 25-26. As a result, the sealing members S on the cylindrical bodies 17 are transferred onto the covering end portions of the electrical wires W. Consequently, the sealing members S are automatically fitted on the covering end portions of the electrical wires W. Then, the electrical wire intermediate member holding unit 73 and the electrical wire covering end portion holding unit 74 are opened, as shown in FIG. 27, to release the hold on the electrical wires W performed by the electrical wire intermediate member holding unit 73 and the electrical wire covering end portion holding unit 74. The first member 13 then retracts, as shown in FIGS. 28-29. Contacts (not shown) are subsequently connected by crimping to the covering end portions of the electrical wires W that have been removed. The sealing member transfer device 10 is then returned to the initial state shown in FIGS. 9A-9B.

Thus, with the sealing member fitting apparatus 1, by holding the electrical wires W at the lead-out members of the electrical wires W from the clamping device 60, the electrical wires W can be set automatically in the electrical wire insertion guide device 70. Moreover, with the sealing member fitting apparatus 1, because the electrical wire intermediate member holding unit 73 holds the electrical wires W between the lead-out members from the clamping member 62 and the covering end portions when the sealing members S are fitted on the electrical wires W, it is possible to prevent buckling of the electrical wires W. This is particularly effective when the electrical wires W having a small external diameter are set in the electrical wire insertion guide device 70.

The foregoing illustrates some of the possibilities for practicing the invention. Many other embodiments are possible within the scope and spirit of the invention. For example, it would also be possible to fit the sealing member S on the covering end portion of a single electrical wire W, instead of fitting a plurality of the sealing members S on the covering end portions of a plurality of the electrical wires W. Furthermore, it is sufficient if the sealing member transfer devices 10 are constructed so as to switch between the sealing member receiving position, which faces the sealing member holding device 30, and the sealing member fitting position, which faces the electrical wire clamping device 60. Additionally, it is not necessary to install the sealing member transfer devices 10 on the base plate 11. Moreover, it is not necessary to install the sealing member transfer devices 10 in a pair; a single sealing member transfer device 10 may also be installed. In addition, with regard to the electrical wire insertion guide device 70, it would also be possible to use a construction in which a plurality of electrical wire intermediate member holding units 73 are provided. It is, therefore, intended that the foregoing description be regarded as illustrative rather than limiting, and that the scope of the invention is given by the appended claims together with their full range of equivalents.

What is claimed is:
1. A sealing member fitting apparatus, comprising:
a sealing member holding device provided with a hollow sealing member;

an electrical wire clamping device that clamps an electrical wire such that a lead-out member and a covering end portion of the electrical wire extend from one side thereof;

a sealing member transfer device that switches between a sealing member receiving position that faces the sealing member holding device and a sealing member fitting position that faces the electrical wire clamping device, the sealing member transfer device receiving the sealing member in the sealing member receiving position and fitting the sealing member on the covering end portion of the electrical wire in the sealing member fitting position; and an electrical wire insertion guide device disposed between the sealing member transfer device and the electrical wire clamping device, the electrical wire insertion guide device being slidable along the electrical wire from the lead-out member of the electrical wire to the covering end portion of the electrical wire, the electrical wire insertion guide device positioning a central axis of the covering end portion of the electrical wire substantially coaxially with a central axis of the sealing member.

2. The sealing member fitting apparatus of claim 1, wherein the electrical wire insertion guide device has an electrical wire covering end portion holding unit that holds the covering end portion of the electrical wire when the sealing member transfer device is in the sealing member fitting position.

3. The sealing member fitting apparatus of claim 2, wherein the electrical wire insertion guide device has an electrical wire intermediate member holding unit that holds the electrical wire between the lead-out member and the covering end portion when the sealing member transfer device is in the sealing member fitting position.

4. The sealing member fitting apparatus of claim 3, wherein the electrical wire covering end portion holding unit and the electrical wire intermediate member holding unit are an integral unit.

5. The sealing member fitting apparatus of claim 3, wherein the electrical wire intermediate member holding unit includes an intermediate member upper holding piece and an intermediate member lower holding piece, the intermediate member upper holding piece having recessed members and the intermediate member lower holding piece having electrical wire receiving grooves, the recessed members and the electrical wire receiving grooves forming holding apertures for the electrical wire when the intermediate member upper holding piece and the intermediate member lower holding piece are joined together.

6. The sealing member fitting apparatus of claim 5, wherein the holding apertures for the electrical wire are continuous with holding apertures in the electrical wire covering end portion holding unit.

7. The sealing member fitting apparatus of claim 1, wherein the sealing member transfer device includes a cylindrical member, the sealing member being positioned on the cylindrical member.

8. The sealing member fitting apparatus of claim 6, wherein a cylindrical member is at least partially received in the electrical wire insertion guide device when the sealing member transfer device is in the sealing member fitting position.

9. The sealing member fitting apparatus of claim 7, wherein the sealing member transfer device includes a retractable guide member, the cylindrical member being positioned on the retractable guide member.

10. The sealing member fitting apparatus of claim 1, wherein the lead-out members are arranged at a specified pitch.

11. The sealing member fitting apparatus of claim 1, further comprising a second sealing member transfer device that switches between the sealing member receiving position and the sealing member fitting position, the second sealing member transfer device receiving the sealing member in the sealing member receiving position and fitting the sealing member on the covering end portion of the electrical wire in the sealing member fitting position, the second sealing member transfer device being in the sealing member receiving position when the sealing member transfer device is in the sealing member fitting position and the second sealing member transfer device being in the sealing member fitting position when the sealing member transfer device is in the sealing member receiving position.

* * * * *